(12) United States Patent
Somura

(10) Patent No.: US 6,857,277 B2
(45) Date of Patent: Feb. 22, 2005

(54) PROCESS AND EQUIPMENT FOR MANUFACTURING CLEAR, SOLID ICE OF SPHERICAL AND OTHER SHAPES

(76) Inventor: Katsuzo Somura, 4-4, Chuo 5-chome, Nakano-ku, Tokyo, 164-011 (JP)

( * ) Notice: Subject to any disclaimer, the term of this patent is extended or adjusted under 35 U.S.C. 154(b) by 46 days.

(21) Appl. No.: 10/362,995
(22) PCT Filed: Sep. 3, 2001
(86) PCT No.: PCT/JP01/07599
§ 371 (c)(1), (2), (4) Date: Jul. 21, 2003
(87) PCT Pub. No.: WO02/18855
PCT Pub. Date: Mar. 7, 2002

(65) Prior Publication Data
US 2004/0099004 A1 May 27, 2004

(30) Foreign Application Priority Data
Sep. 1, 2001 (JP) ....................................... 2000-265037

(51) Int. Cl.$^7$ ................................................. F25C 1/00
(52) U.S. Cl. .................................. 62/74; 62/75; 249/92
(58) Field of Search ............................... 62/74, 75, 347, 62/356, 300, 301; 249/91, 92, 93, 97

(56) References Cited

U.S. PATENT DOCUMENTS 3,296,822 A * 1/1967 Hans Gram ................... 62/341

(List continued on next page.)

FOREIGN PATENT DOCUMENTS

| JP | U 1-58060 | | 4/1989 |
| JP | 401310277 A | * | 12/1989 |
| JP | 402161271 A | * | 6/1990 |

*Primary Examiner*—William Doerrler
*Assistant Examiner*—Mohammad M. Ali

(74) *Attorney, Agent, or Firm*—Oliff & Berridge, PLC

(57) ABSTRACT

The process and equipment, according to this invention, for manufacturing clear, solid ice of spherical and other shapes are capable of making clear ice balls and block ice of other shapes in the mold quickly, efficiently, and with effective energy utilization. This process is characterized in the steps of:

a) preparing a mold for making ice balls and block ice of other shapes, which comprises an upper mold (24a) made of an insulating material and provided with a vertical injection hole (23) drilled therein and a water-injection nozzle (22) fitted in the hole; and a lower mold (24b) made of a water-freezing block (26) having coolant pipe (25) embedded therein;

b) preparing for a domed lid (21a) or the lid of a different shape made of an insulating sheet, said lid (21a) having a shape that fits in with the surface shaped for the upper mold (24a) and being provided with a cylinder for being fitted into the vertical injection hole (23); and a shaped hemispherical cup (21b) of the same insulating sheet, which similarly fits in with the shaped surface of the lower mold (24b);

c) assembling both halves of the mold (24) after the lid (21a) and the cup (21b) have been attached tightly to each other and placed in the mold;

d) then, keeping the liquid to be frozen cooled at a predetermined temperature and spraying the liquid intermittently in the direction of the water-freezing block (26) that has been cooled to a predetermined freezing temperature;

e) repeating the spraying operation to freeze the sprayed liquid in the container (21), layer by layer, until clear ice balls (20) or block ice of other shapes are formed; and f) disassembling the halves of the mold under the ice-releasing effect, which the ice container (21) has on the ice-making mold (24), and immediately taking out We shaped ice balls (20) or the block ice of a different shape.

20 Claims, 22 Drawing Sheets

U.S. PATENT DOCUMENTS

| | | | | |
|---|---|---|---|---|
| 4,852,359 A | * | 8/1989 | Manzotti | 62/68 |
| 5,618,463 A | * | 4/1997 | Rindler et al. | 249/92 |
| 5,970,735 A | * | 10/1999 | Hobelsberger | 62/356 |
| 6,286,331 B1 | * | 9/2001 | Lee | 62/340 |
| 6,425,438 B1 | * | 7/2002 | Hahn | 165/47 |
| 6,534,106 B2 | * | 3/2003 | Cathenaut et al. | 426/317 |

* cited by examiner

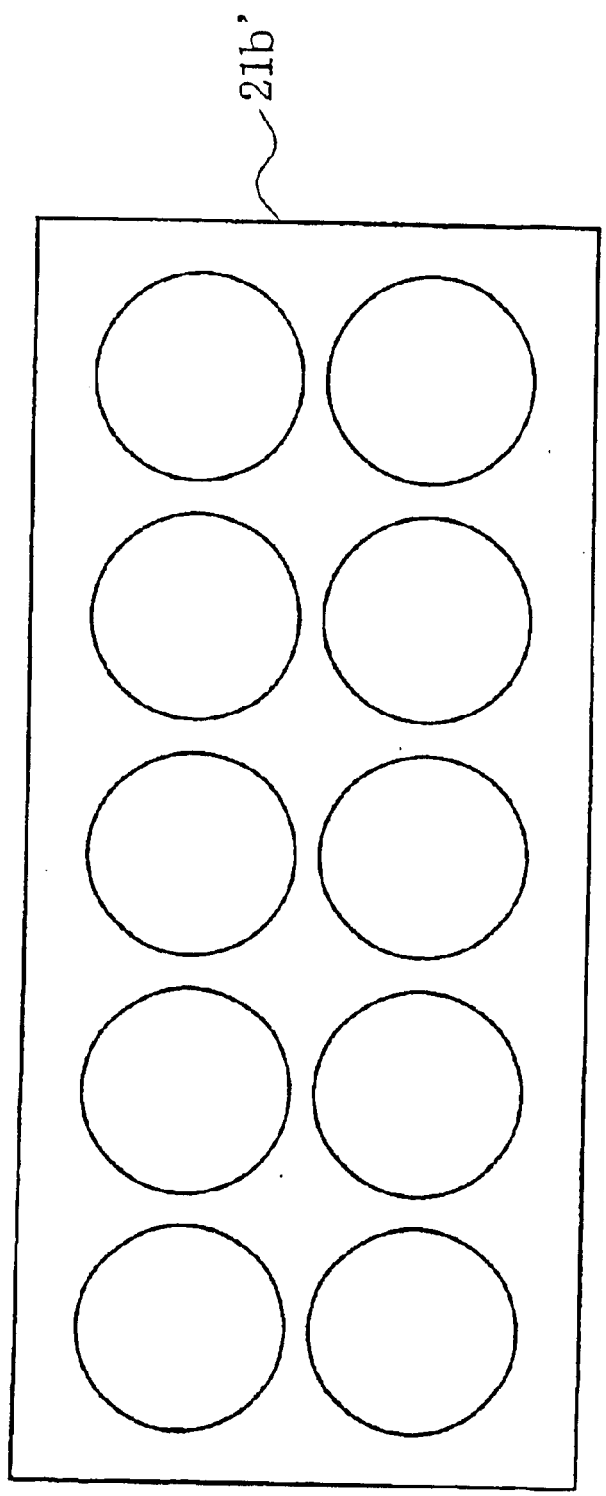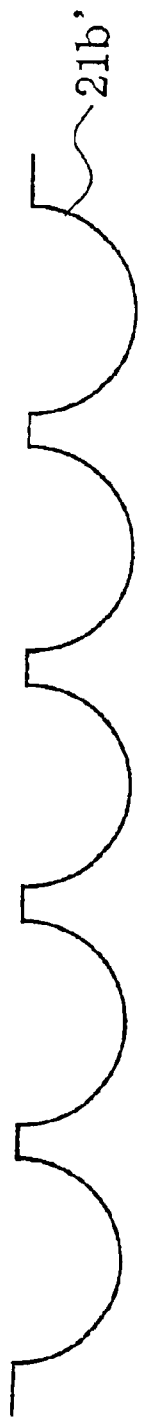
Fig. 5a
Fig. 5b

US 6,857,277 B2

PROCESS AND EQUIPMENT FOR MANUFACTURING CLEAR, SOLID ICE OF SPHERICAL AND OTHER SHAPES

TECHNICAL FIELD

This invention relates to the process and equipment for manufacturing clear ice balls of the type frozen in the mold. These ice balls according to this invention are used for drinks to cool spirits and alcoholic beverages and are equivalent to those ice balls that are shaped by the bartender from clear ice by cutting it with artisan skill, or are shaped into balls with the grinder from block ice, put in a glass and served to the customer who has ordered a glass of alcoholic beverage. The size of ice balls ranges from too big one to put in the mouth to the balls as small as a piece of candy. These ice balls belong to a different field in use and size from the ice for shot blast or from small ice for instant cooling use, but are manufactured in the form. And as such, the process and equipment of this invention should also be applied to other types of shaped ice capable of being released from the mold.

There have been various proposals on the manufacture of ice balls of the type frozen in the mold.

For example, Japanese patent application (OPI) No. 1980-158461 described a water-freezing method, each as shown in FIG. 18. Water is poured in a bag container 1 made of a synthetic resin having elasticity even at a low temperature. This container 1 is set stably in a hemispherical container 2 made of a metallic material, such as aluminum, having good heat conductivity. The container 1 is left to cool until water is frozen into ice.

Japanese patent application (OPI) No. 1984-49856 described a spherical container, such as shown in FIG. 19, comprising upper and lower hemispheres, which are tightly sealed by screws 3 that makes both halves engaged and tightened up with each other at the connecting portion. On top of the upper hemisphere is a hook-like pipe 5 for hanging the spherical container 4. This pipe 5 is fitted vertically to the container 4, and pure water 6 can be poured into the container 4 through the pipe 5.

This container 4 is put inside a freezing tank with a setting at a freezing temperature near 0 degrees C. It is insisted that when the container 4 is swung in the freezing tank, water freezes without clouded core portion of the ice ball. The ice ball thus frozen can be taken out by separating the upper and lower halves.

Japanese patent application (OPI) No. 1992-15069 proposed a method of manufacturing golf balls of ice, which smash up on impact. As shown in FIG. 20a, a hemispherical lid 7 looks like an upper half of a hollow ball somewhat larger than a golf ball, obtained when the ball has been cut horizontally into halves. A wide ring 8 has a larger circumference than the container halves, is an integral part of the container 9 or the lower half of the ball, and is provided around the circular cross section. Both container halves 7 and 9 fit in with each other, as shown in FIG. 20b, and the upper lid 7 does not fall easily even when the combined container is turned upside down.

If these container halves 7 and 9 are fitted in water, then water 10 is filled inside the container as shown in FIG. 20b, and when the container is taken from underwater, no water runs out of the container.

It is insisted, therefore, that ice balls are obtained when this container with water inside is frozen.

However, in the case of FIG. 18, it is contemplated that the cold temperature penetrates the water to be frozen in the order of A, B, and C, wherein A is a portion in contact with the metallic hemispherical container 2, B is a portion in contact with atmosphere through the mouth of the bag container 1; and C is the portions where the bag container 1 having insulating action exists between water and the freezing atmosphere. In that case, the upper and lower portions freeze first, and the middle portion, especially the core portion, is the last to be frozen, thus resulting in typical unclear ice having clouded core. This method would never create such ice as intended by this invention.

In the case of FIG. 19, too, such ice as intended by this invention would never be manufactured because coldness penetrates water simultaneously over the entire surface of the spherical container. However the container is swung, the core portion would become clouded in the same way as in the case of FIG. 18.

Likewise in the case of FIG. 20, the ball container is left to freeze simultaneously over the entire surface, starting from the surface and ending at the core portion. Ice thus obtained is at the lowest level in its quality, and has no other choice but giving clouded core portion.

In contrast to the above conventional art, a proposal from Japanese patent publication No. 1994-89970 makes it possible to obtain clear ice. This method is shown in FIGS. 21 and 22. The ice-making equipment shown in FIG. 14 comprises a plural number of ice-making cups 11, 11, a pair of covers 12, 12 for each ice-making cup, a substrate, the first nozzle 14, a coolant pipe 15, and the second nozzle 16, 16.

The ice-making cup 11 is formed into a hemispherical shape of a certain diameter, from a metal plate, such as aluminum or stainless steel. The cups are arranged in lines and rows, in a state in which cups are turned bottom up, with the opening facing downward. These cups are fitted at given positions by connecting them with, for example, substrates 13 of the same material.

A coolant pipe 15 is tied around the bottom or the head portion of the ice-making cup 15, as shown in FIG. 21.

In the meantime, the covers 12 are made of a metal plate of the same material as used for the ice-making cup 11, or made of a synthetic resin plate, and are formed into a pair of quarters of the sphere with the some diameter as the ice-making cup 11, as obtained by equally dividing a hemisphere similar to the ice-making cup 11. The two quarters in a pair are fitted to the downside of the substrates 13 and are supported swingably through hinges 17 at positions corresponding to the ice-making cup 11. In this case, the two covers 12 are fitted to the substrates 13 in such a relationship that the two covers are combined together to form a hemisphere and that the covers 12 and the cup 11 form a sphere.

Each hinge 17 is an attachment to the respective cover 12 and has the following structure: Each of distorted tetragonal tabs has a pinhole bored through the tab and is protruded like an ear from the central part of each lateral periphery of the quarter of the sphere. Both tabs are fitted to the substrate 13 by engaging them with the fittings suspended from the substrate 13 at corresponding positions and inserting a pin through each pinhole. In their closed state, the attached pair of covers 12, 12 faces each other and comes in contact with each other right under the ice-making cup 11. Both covers 12, 12 are movable in the opposite directions to leave each other, and in their open state, the lower hemisphere breaks to make the mouth wide open.

The covers 12, 12 are provided with an opening 18 having a certain diameter at the central, lowest part of vertical periphery of each quarter of the sphere. Each quarter has a half circle for water injection so that in the closed state, both quarters form a circular opening 18 at the bottom.

The hinges 17 of the covers 12, 12 are provided each with a spring 19, such as a coil spring, which acts a force on each cover to keep both covers 12, 12 closed during the ice-making operation.

The process of ice-making operation is shown in FIGS. 22a to 22d. The ice-making cup 11 is cooled to a low temperature by the coolant pipe 15. Meanwhile, raw water for ice making use is spurted from the lot nozzle 14 and is shot into the ice-making cup 11 through the opening 8 (FIG. 22a). The water to be iced spreads over the inner surface of the ice-making cup 11 and the covers 12, 12. Then water drips from the opening 18 and is collected into a water tank. After the water temperature has deceased, water is again sent to the water pump, and is spurted from the 1st nozzle 14 into the ice-making cup 11.

In this way, an ice layer is formed first on the inner surface of the ice-making cup 11, and later on the inner surfaces of the covers 12, 12. Therefore, the ice layer gets thick first on the upper part of the ice-making cup 11. Then, ice gradually becomes spherical over time (FIG. 22b).

As soon as the ball surge leaves the inner surfaces of the cup and the covers, the self-weight of the ice ball is automatically dispersed on the pair of covers 12, 12. As this self-weight overcomes the force of the spring 19, the ice ball begins to drop downward. With the covers 12, 12 forced to open wide, the ice ball completely breaks away from the ice-making cup 11 and the covers 12, 12, and drops into an ice-receiving tank (not shown) (FIG. 22d). In this system, raw water for ice making is not sealed inside a mold from the beginning, but is ejected therein serially to form thin laminates of ice. Like icicles, this ice ball can be clear to the core.

The proposal of Japanese patent publication No. 1994-89970 makes sure of clear ice ball manufacture, but it has the following drawbacks:

(1) After raw water is ejected, water is collected except for the iced portion, and is re-jected. In other words, water is recycled and reused. Because of this recycling, the opening 18 is clogged up with ice before round ice is completed. (Since recycled water tends to have a temperature at which water is frozen easily, the opening 18 begins freezing and clogging.) Eventually, it seems that solid block of ice fails to complete.

(2) It is reported that freezing takes place not only in the ice-making cup 11 equipped with the coolant pipe 15, bat also on the covers 12, 12. It means that cooling is necessary for the space under substrates 13 where there are the covers 12, 12 and therefore that strong freezing equipment is required for this purpose. As regards the ice-making cups 11, the coolant pipe 15 is inefficient because it is tied around the head portion of the cup 11, and a major part of the pipe 15 is exposed to air. Enormous energy is thus required to cool both of the ice-making cup 11 and ambient air surrounding the covers 12, 12.

(3) This enormous energy is not utilized efficiently. It is rather wasted because the ice-making process requires discontinued operation, energy loss, and repeated release of energy. For example, after ice balls are formed within the cup 11 and the covers 12, 12, hot gas is passed through the coolant pipe 15. In addition, water of normal temperature is ejected onto the covers 12, 12 from the nozzles 16. Then, when ice-making process resumes, the coolant pipe 15 and the covers 12, 12 have to be cooled again. This is inefficient utilization of heat.

The object of this invention is to provide a new means of manufacturing clear ice balls by forming laminates of ice inside the mold so as to ensure that many, clear ice balls can be mass-produced reliably and that input energy can be utilized efficiently. In addition, ice of other shapes can be obtained by changing the shape of the ice-making cup and the covers.

DISCLOSURE OF THE INVENTION

The means of achieving the above-described object comprises a process for manufacturing clear, solid ice of spherical and other shapes, which process is characterized by the steps of:

a) preparing a mold for making ice bails and block ice of other shapes, which comprises an upper mold made of an insulating material and provided with a vertical injection hole drilled therein and a water-jet nozzle fitted in the hole; and a lower mold made of a water-freezing block having coolant pipe embedded therein;

b) preparing for a shaped lid of a hemispherical or different shape made of an insulating sheet, said lid having a shape corresponding to the surface shaped for the upper mold and being provided with a bottom flange and a cylinder for being fitted into the vertical injection hole; and a shaped cup of the same insulating sheet, which similarly corresponds to the shaped surface of the lower mold and is provided with a top flange;

c) assembling both halves of the mold after the domed lid (or the cover having plural lids) and the cup (or the tray having plural cups) have been attached tightly to each other and placed in the mold;

d) then, keeping the liquid to be frozen cooled at a predetermined temperature and spraying the liquid intermittently in the direction of the water-freezing block that has been cooled to a predetermined freezing temperature;

e) repeating the spraying operation to freeze the sprayed liquid in the tray, layer by layer, until clear ice balls or block ice of other shapes are formed; and f) disassembling the halves of the mold under the ice-releasing effect, which the ice container has on the ice-making mold, and immediately taking out the shaped ice balls or the block ice of a different shape.

The equipment for manufacturing clear ice balls and the block ice of other shapes comprise:

a mold for molding ice balls and block ice of other shapes, which comprises an upper mold made of an insulating material having a vertical injection hole drilled therein and a water-jet nozzle fitted in the hole and connected to an intermittent injection mechanism; and a lower mold made of a water-freezing block having coolant pipe embedded therein; and spherical containers or the containers shaped otherwise, which comprise a domed lid or the lid of a different shape made of an insulating sheet, said lid having a shape corresponding to the surface shaped for the upper mold and being provided with a bottom flange and a cylinder for being fitted into the vertical injection hole; and a Shaped cup of the same insulating sheet, which similarly corresponds to the shaped surface of the lower mold and is provided with a top flange.

There are two types of spherical containers. A type is a container divided into upper and lower halves. The upper half or the domed lid has a shape attachable tightly to the surface shaped for the upper mold and is provided with a bottom flange and a cylinder for being fitted into the vertical injection hole. The lower half or the hemispherical cup has a shape attachable tightly to the surface shaped for the lower mold and is provided with a top flange. The other type is a container divided vertically into the right and left halves. The lower half portion of the combined container is attached tightly to the surface of a hemispherical or another shape, and is provided with a cylinder for being fitted into the vertical injection hole and with a side reinforcing flange.

The above-described spherical container is made of a resin sheet material, such as styrol, or a metal plate material, such as aluminum, which is hard and highly heat-conductive.

When water is injected into the shaped container on the cooled water-freezing block, the injected water is soon frozen under the freezing atmosphere after a very short period of retention because the amount is small.

This fast freezing ability is convenient when juice and other solutions are to be frozen, because juice is frozen before separation will take place.

Ice on the bottom of the spherical container receives coldness from the water-freezing block, and ice itself becomes an ice-cold source, which freezes up at once the intermittently injected water sprayed on the frozen water. Like icicle formation, thin clear laminated ice is obtained by this most reliable, most efficient ice-making method. The upper mold is a heat-insulating material that confines coldness of the lower part. This mechanism is energy saving and economic because the entire space in the spherical container to be filled with ice can be cooled by means of only the water-freezing block.

The water-freezing block can be a big one if the block is designed to give a thick configuration. When another round of freezing operation starts, a thick freezing block is advantageous because the previously produced ice does not affect the thick block even if coldness is drawn therefrom, and so the subsequent ice can be made quickly. (Ice cold source need not be operated more powerfully than usual.)

An insulating sheet (a container) stands between the inner surface of the mold and ice to prevent ice from coming in contact with the water-freezing block. Because this insulating sheet serves as a mold-release agent, it is easy to release ice from the mold and to take ice out of the mold (with no requirement for heating).

In the case of a container made of a resinous sheet material, such as styrol, the container serves as a packaging material after ice has been made. As a commercial product, ice is kept packed in the container. The container to be divided into two halves is convenient when ice is taken out. In the case of a metal plate container, it belongs to the mold. After ice has been taken out, the container is put back into the mold.

It is contemplated that a resinous sheet material such as styrol, may have less tight contact with the mold because of its flexibility even if the resinous sheet has good molding precision. Because of a heat-insulating air layer existing inside the container as an intervention and the resistance of the resin itself to thermal conductivity, it is possible to think of a fear that the surface of sprayed water may not have a predetermined freezing temperature and therefore that precise ice production cannot be expected. There is no such concern in the case of a metal plate material, such as aluminum, which is a hard and good thermal conductor. This is because metal plates secure thermal conductivity by way of the unavoidable contact with the water-freezing block, ie., the cold source, even if the container has less molding precision and incomplete contact with the mold. And there may happen non-uniform temperature distribution among separately configured freezing blocks, and it may become impossible to make uniform ice. Even if such a problem occurs, non-uniform temperature distribution among blocks can be solved conveniently by inserting a thermally conductive plate, such as an aluminum plate, between two adjacent freezing blocks in a manner that the plate can be contacted with each spherical container.

BRIEF DESCRIPTION OF THE DRAWINGS

FIGS. 5a and 5b are a plan view and a front view of the tray for mass production of ice balls made in the spherical container of the type divided into upper and lower halves, to be used in the preferred embodiment of this invention.

PREFERRED EMBODIMENT OF THIS INVENTION

This invention is further described in the case of ice balls, now referring to FIGS. 1–17.

Figure 1:
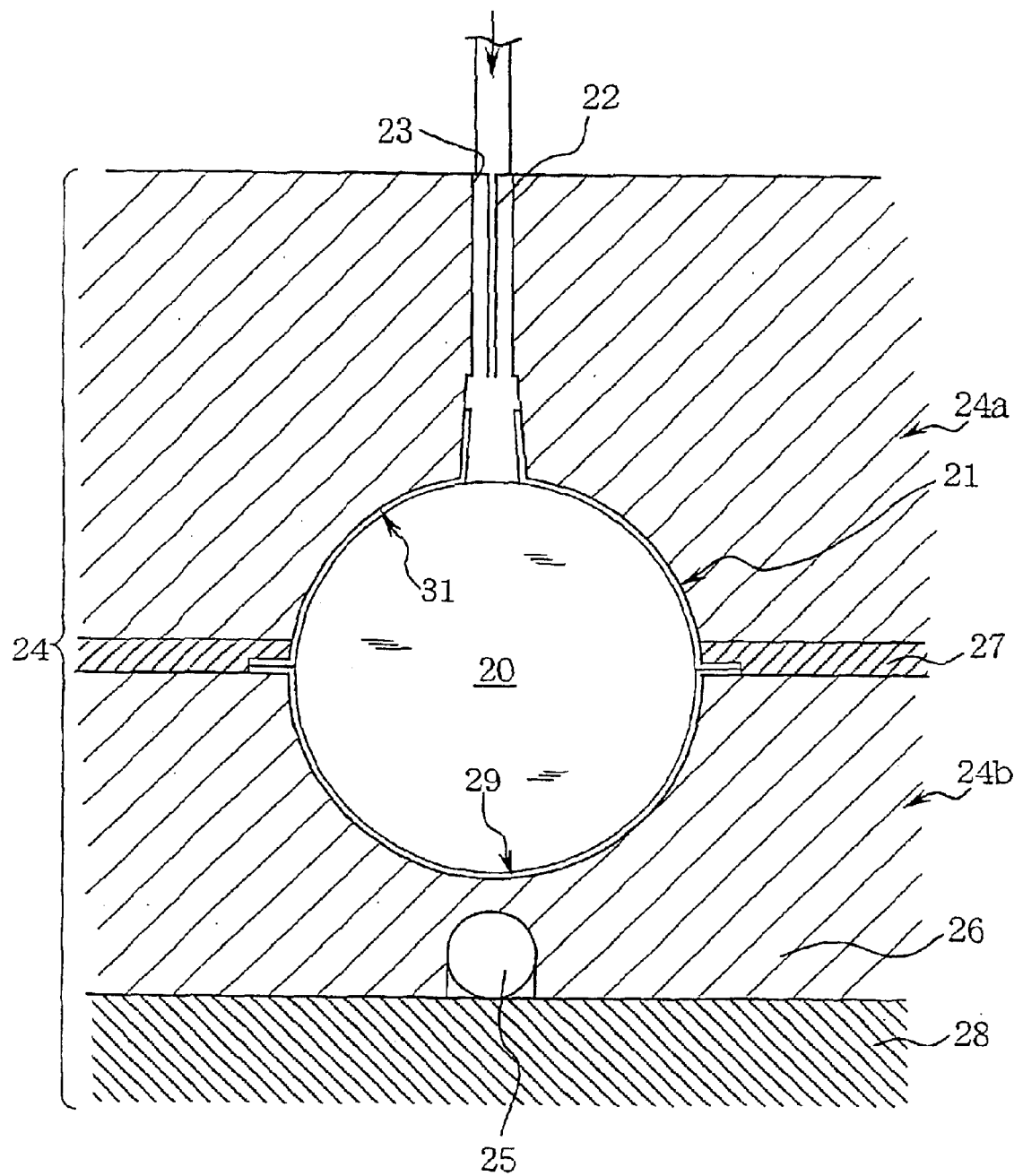
FIG. 1 is an explanatory diagram showing the equipment in the preferred embodiment of this invention in the state in which an ice ball has been completed.

FIG. 1 shows an overall configuration of the equipment for making a clear ice ball in the preferred embodiment of this invention (the mold and the spherical container of the type divided into upper and lower halves), in the state in which ice has been completed. The ice ball 20 is packed in the container 21, which in turn is abut in the mold 24 for making ice balls. This mold 24 comprises an upper mold 24a and a lower mold 24b. The former is made of a heat-insulating material and is provided with an injection nozzle 22 that is connected to an intermittent injection mechanism; the latter is the water-freezing block 26, in which the coolant pipe 25 is embedded (In FIG. 1, the pipe is located right under the mold).

In FIG. 1, a rubber gasket layer 27 is disposed preferably on the underside of the upper mold 24a, and is used for the sake of completeness to put the container exactly between both halves of the mold 24, while holding tight the flanges of the container 21.

A heat-insulating layer 28 serves to prevent coldness from escaping through the surfaces of the water-freezing block 26. Naturally, this layer should be disposed not only on the bottom of the mold 24, but also on the sides.

Because of this heat-insulating layer 28, the coldness generated by the water-freezing block 26 is entirely directed toward the space for the water to be frozen inside the mold 24.

The water-freezing block 26 has round holes 29 dug in the lower mold, and the upper mold 24a that covers the water-freezing block 26 is provided with domes 31, which correspond in shape to respective round holes 29.

Figure 2A:
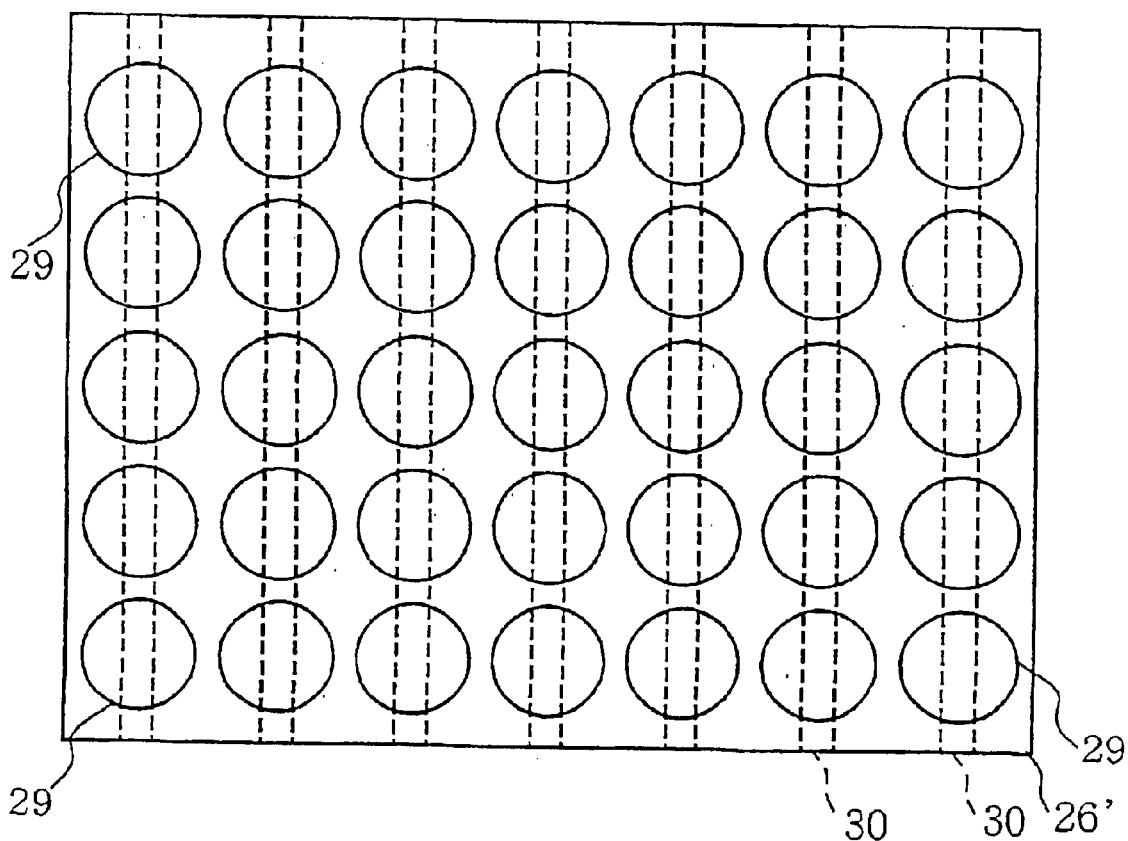
FIGS. 2a and 2b are a plan view and a front view of the water-freezing block to be used for the equipment in the preferred embodiment of this invention.
Figure 2B:
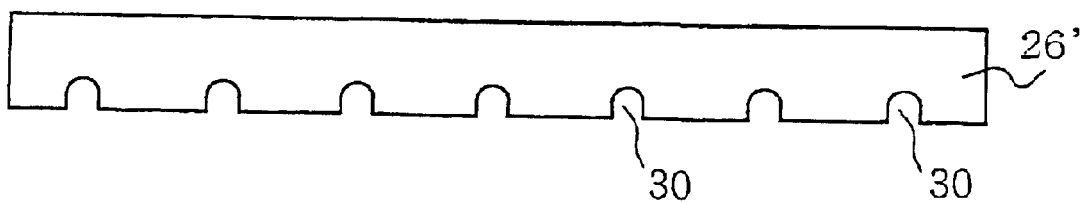

FIG. 2 shows a water-freezing block 26 used to manufacture many ice balls.

As seen, many round holes 29 are disposed in a lattice pattern on a larger-size, water-freezing block 26'. Right under the round holes 29 run the rows of grooves for embedding the coolant pipes 24.

Figure 3:
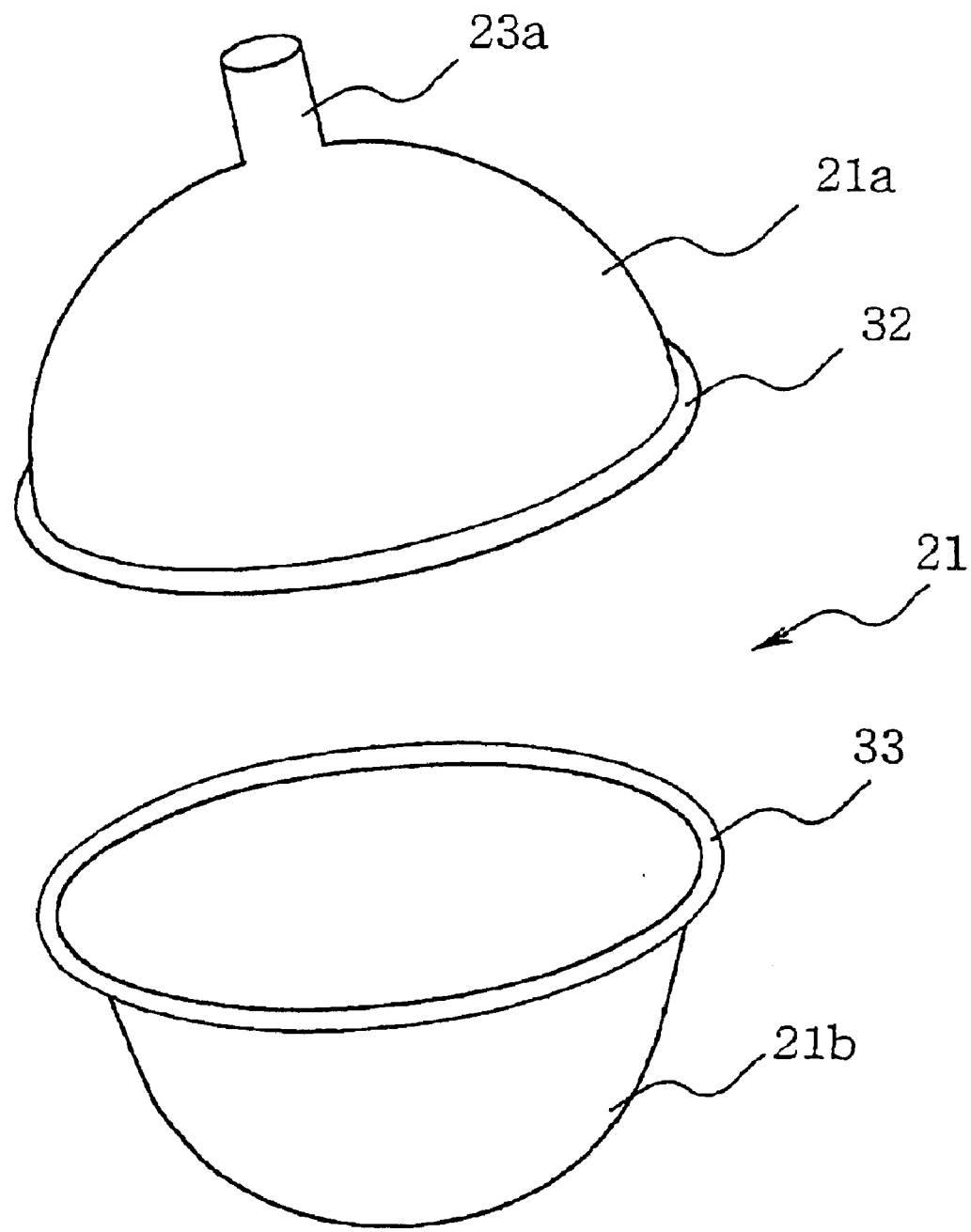
FIG. 3 is an explanatory diagram showing a spherical container of the type divided into upper and lower halves, to be used for the equipment in the preferred embodiment of this invention.

FIG. 3 shows one of the above-described spherical containers 21.

The domed lid 21a and the hemispherical cup 21b are provided respectively with the bottom flange 32 and the top flange 33. A vertical cylinder 23a is disposed on top of the dome and is fitted into the vertical injection hole 23 to allow for the passage of injected water.

Figure 4A:
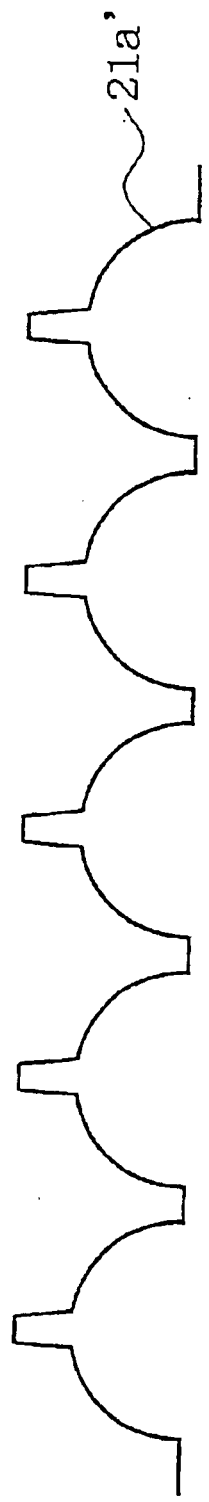
FIGS. 4a and 4b are a plan view and a front view of the cover used with the tray for mass production of ice balls made in the spherical container of the type divided into upper and lower halves, to be used in the preferred embodiment of this invention.
Figure 4B:
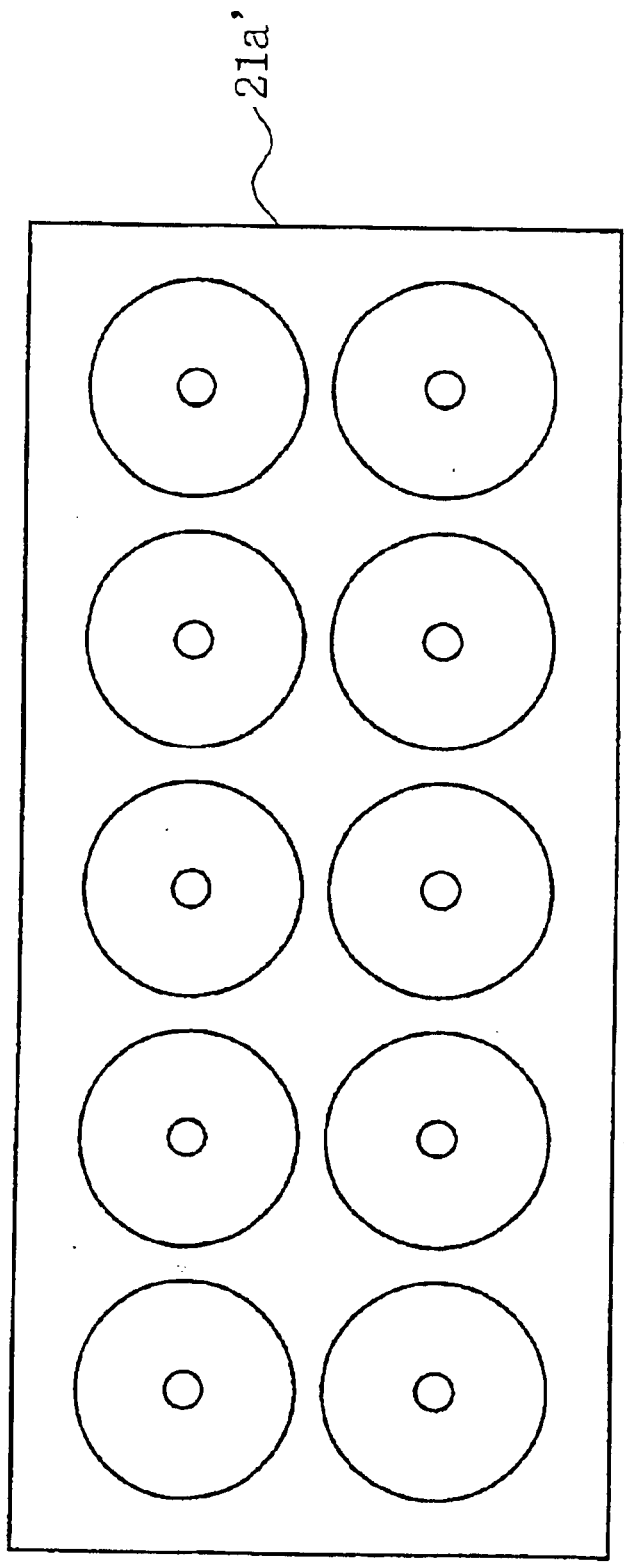

FIGS. 4 and 5 show a cover 21a' and a tray 21b' of an integral type having many domed lids and cups, respectively, for use with the larger-size, water-freezing block 26'.

FIG. 4 shows a cover 21a' of the integral type prepared by the vacuum molding; FIG. 5 shows a tray 21b' of the integral type having hemispherical cups shaped therein.

Figure 6:
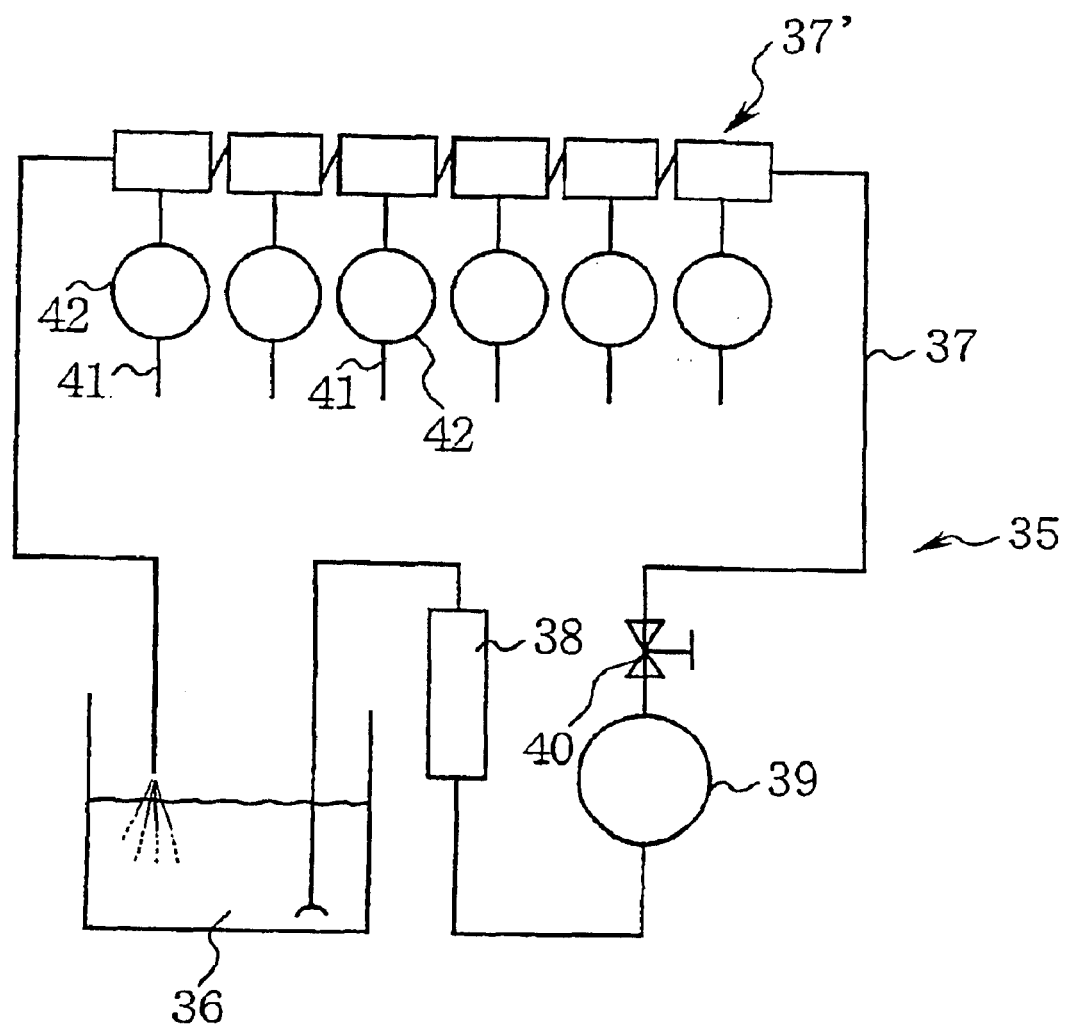
FIG. 6 is an explanatory diagram showing the mechanism for intermittent injection of raw water, to be used in the equipment of this invention.

FIG. 6 Shows an intermittent injection mechanism 35, which is connected to the above-described water injection nozzle 22.

In FIG. 6, raw water tank 36 sends water into circulating water pipe 37. On the way, water passes through filter 38, constant pressure pump 39, the suction adjusting pressure valve of this pump 39, and air supply valve 40, respectively, for the filtration of suctioned water, the setting of pressure inside the pipe 27, and the mixing of air into water (so water may have a mild taste). Circulation of raw water is preferred to prevent liquid mixtures from being separated.

Branching pipes 41 are connected to each injection nozzle 22 by way of distributor 37'. A tube pump 42 is disposed halfway on each branching pipe 41 to supply water in an intermittently fixed amount.

Figure 7:
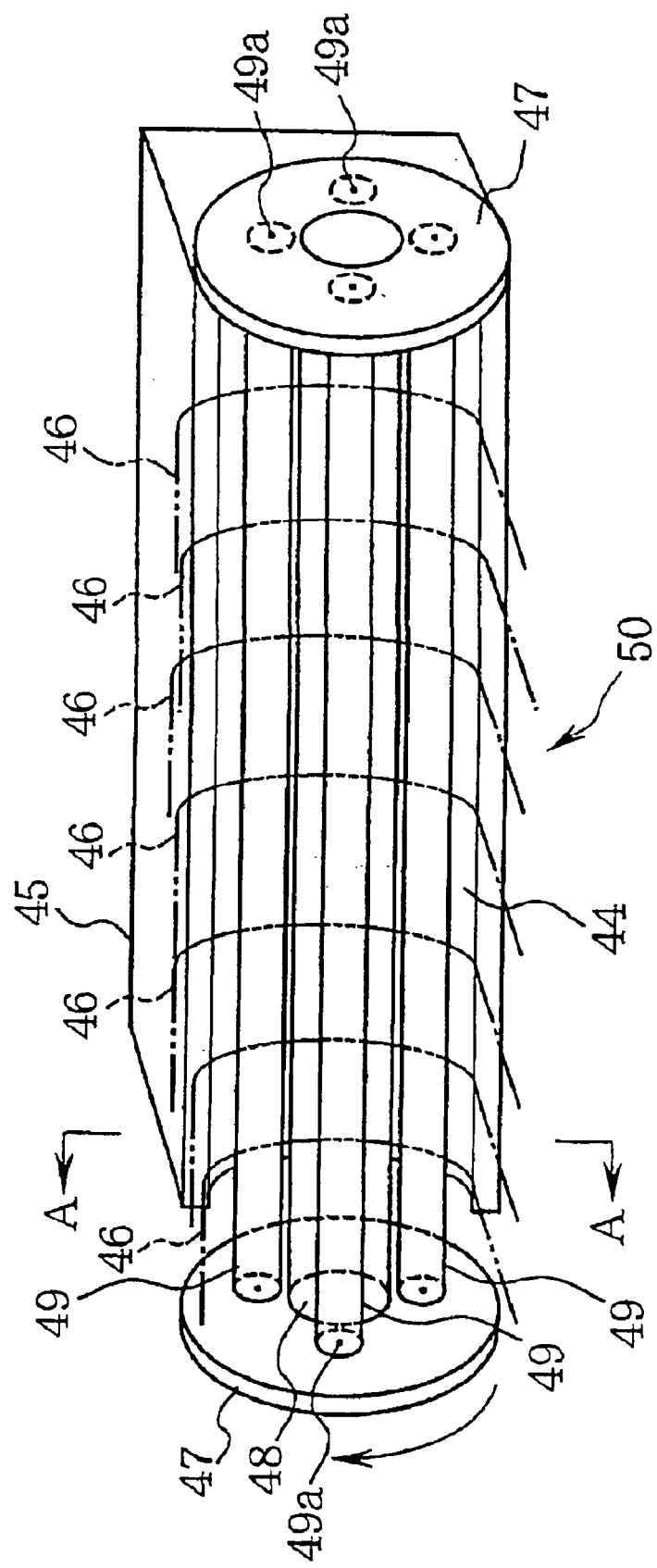
FIG. 7 is a perspective illustration showing a pushing mechanism of the tube pump used in this invention.
Figure 8:
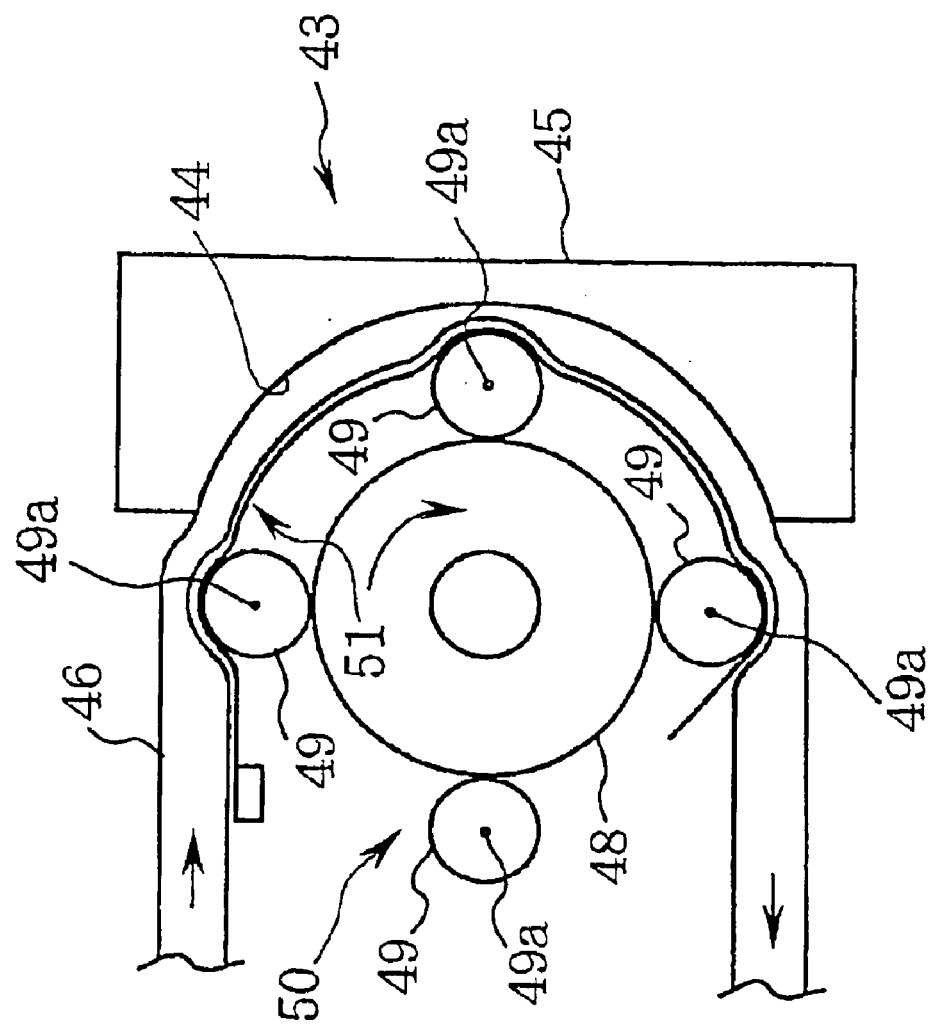
FIG. 8 is an explanatory diagram showing the mechanism of the tube pump, taken in the arrowed direction from line A—A of FIG. 7.

FIGS. 7 and 8 show an example of the plural tube pumps 42 shown in FIG. 6. The pushing mechanism used for the tube pumps 43 of this invention stands face to face with an arc surface 44 of a pump mount 45 for accommodating the tube pumps 46. As shown in FIG. 7, this pushing mechanism is a rotating body comprising a given number of one-point pressure rollers 49 disposed around a shaft 48 but not in contact with the circumference thereof. The shaft 48 extends from one bracket 47 to the other bracket 47, surrounded by one-point pressure rollers 49, which are kept at satellite positions by each roller shaft 49a.

However, since the pushing mechanism (one-point pressure rollers 49) has no pinch roller configuration, it does not drag anything that comes in contact, and rotates passively in response to an added force.

A plural number of tubes are disposed between the pump mount 45 and the rotating body 50, with the tube upstream being fixed, and the downstream unfixed, as not to bend the tubes.

In addition, as shown in FIG. 8, a thin foil material 51 is disposed between the tubes 46 and the rotating body 50, with upstream fixed, and downstream unfixed. This foil has high durability, flexibility, and slidability against rollers.

If a commercially available foil product is used, various tests with aqueous solutions indicate that a stainless steel foil of less than 0.9 mm thick is preferred for ordinary tubes. (It was confirmed from various tests that at a thickness of 0.1 mm or more, the dragging effect is not solved completely but that at a thickness of less than 0.9 mm, the dragging effect could be eliminated for the first time. It is contemplated that this side effect is caused from the fiction between the foil and the tubes 46 at the points of contact with the one-point pressure rollers 49 if the foil has some rigidity and no certain level of flexibility. The one-point rollers 49 are considered effective to some extent to eliminate the dragging effect because these rollers 49 have a free-rotating configuration. However, for perfect elimination of this side effect, it is a key point that the foil has a thickness of less than 0.1 mm because at this thickness, the foil is as flexible as to able to prevent friction from being generated.)

As shown in FIG. 8, four one-point pressure rollers 49 are disposed at an equivalent interval to ensure that at least two rollers stand face to face with the arc surface. This arrangement is suitable because a fixed quantity of liquid can be measured out precisely between two rollers 49, 49, and is carried to respective spherical containers.

Figure 9:
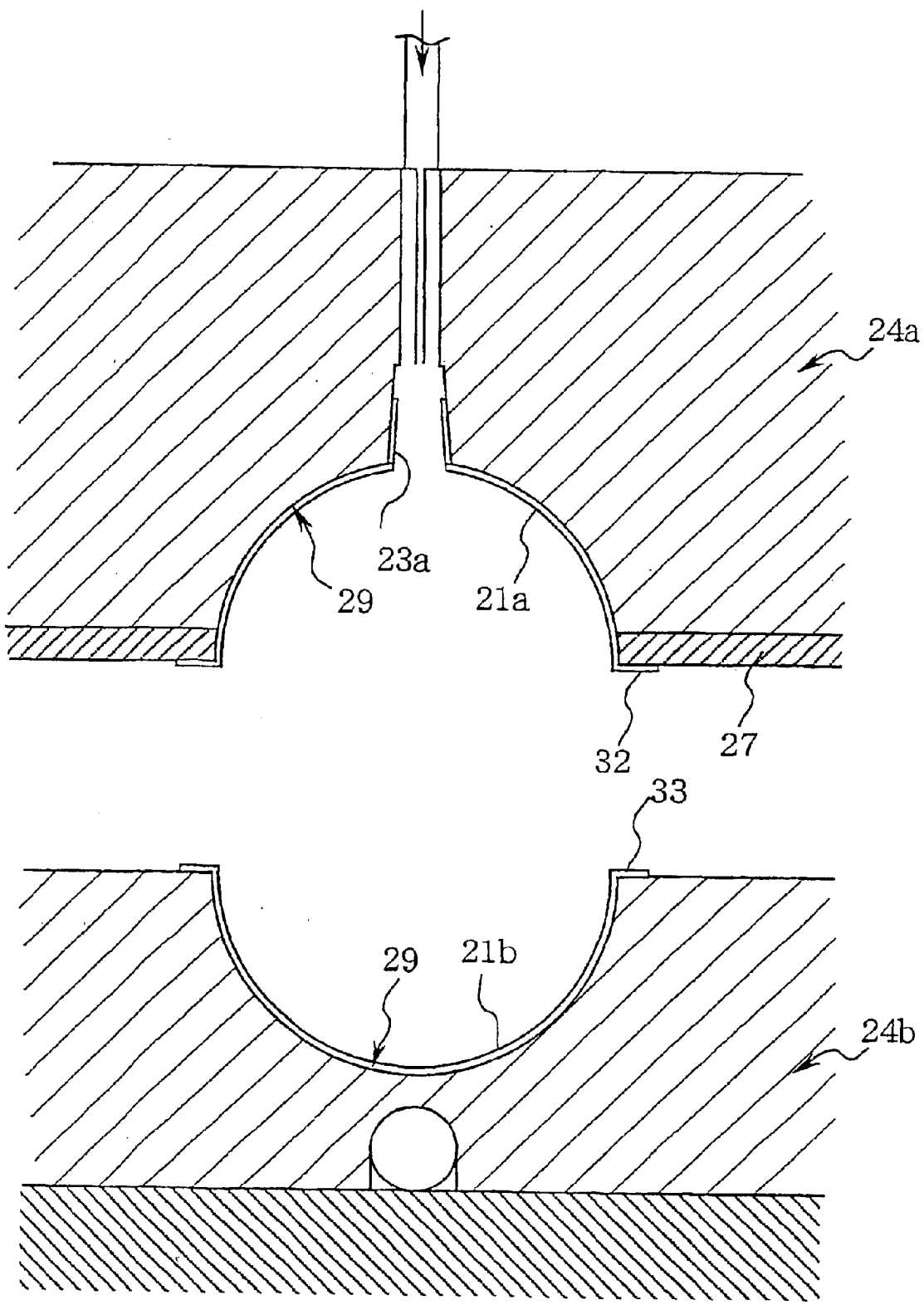
FIG. 9 is an explanatory diagram showing the equipment in the preferred embodiment of this invention in the state in which the mold halves have been separated.

However, under the circumstances in which the upper mold 24a is separated from the lower mold 24b, as shown in FIG. 9, the hemispherical cup 21b and the domed lid 21a are fitted tightly into the round hole 29 and the dome 31, respectively.

Figure 10:
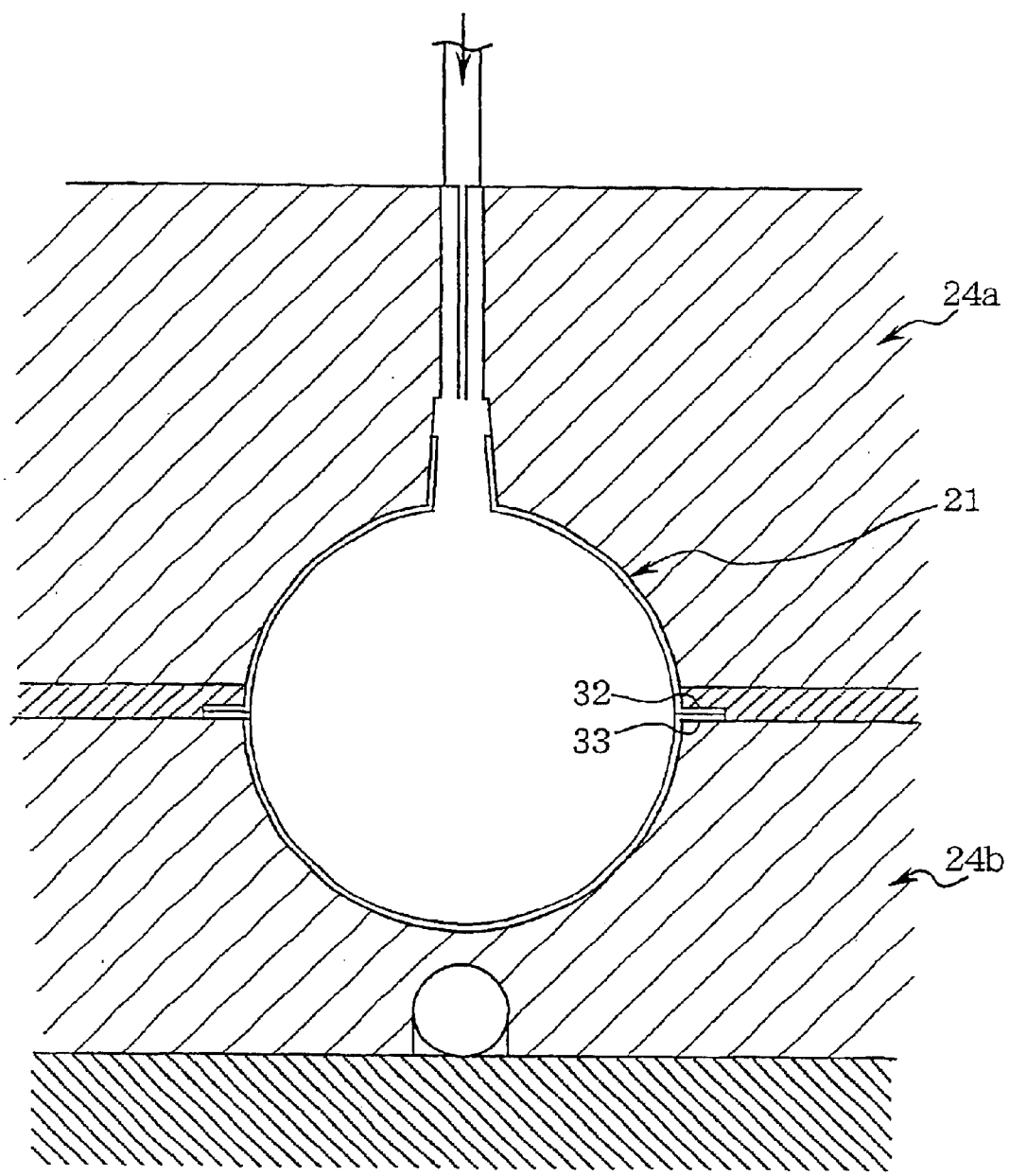
FIG. 10 is an explanatory diagram showing the equipment in the preferred embodiment of this invention in the state in which all parts have been assembled.
Figure 11:
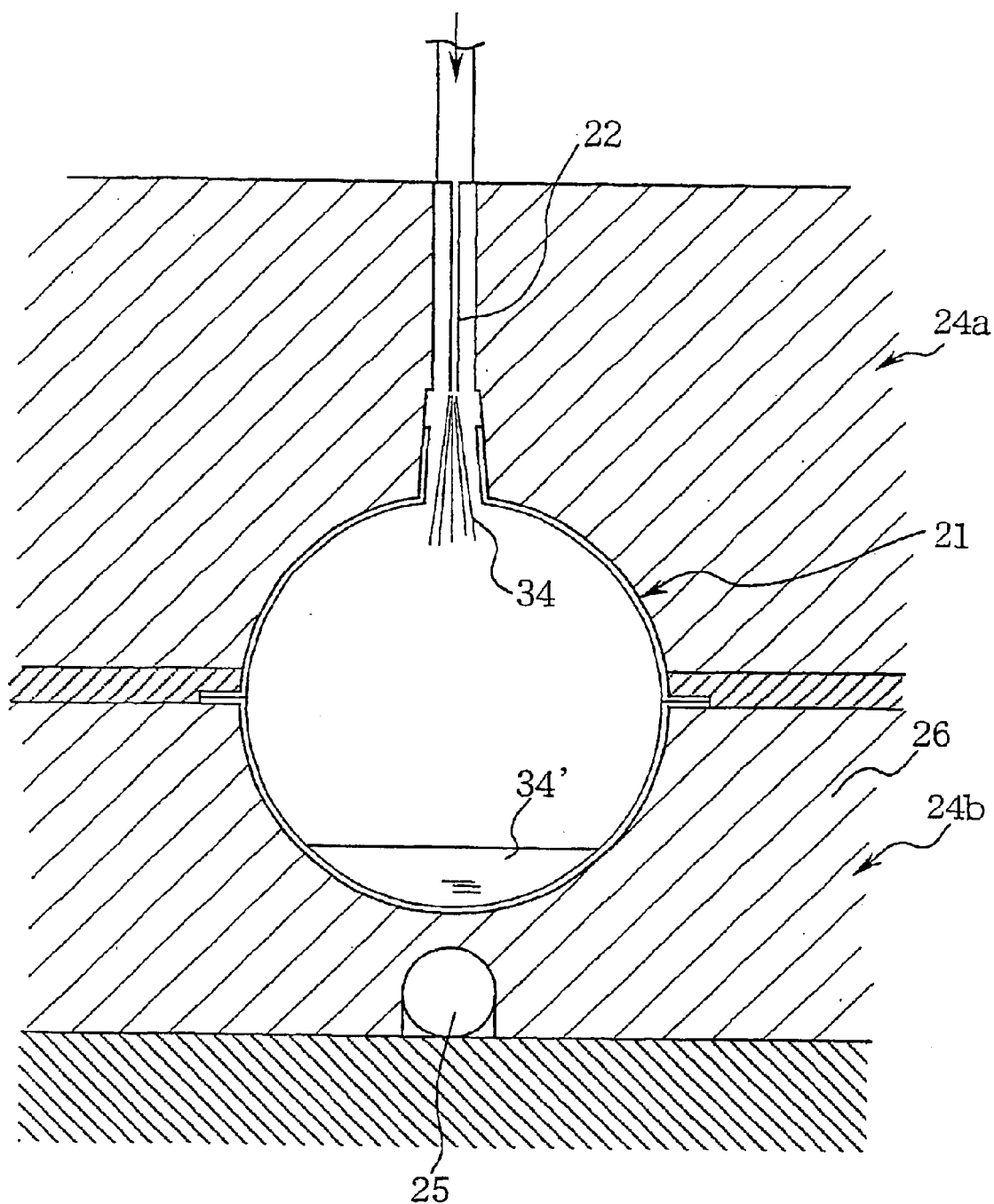
FIG. 11 is an explanatory diagram showing water injected inside the mold to be used in the preferred embodiment of this invention.

As shown in FIG. 10, the upper mold 24a is then assembled with the lower mold 24b. The domed lid 21a and the hemispherical cup 21b are pressed to each other as the flange 32 is put on top of the flange 33. Thus, joint seal is completed for the space inside the spherical container 21.

The water-freezing block 26 has been fully cooled by means of the coolant pipe 25 to a temperature of −3 to −6 degrees C. that is suitable for clear ice. Raw water 34 (10 degrees C. or less) is then intermittently injected from the injection nozzle 22. (The end of the nozzle 22 is disposed at a certain height above the freezing level so as to prevent the nozzle from being clogged due to the contact with the top of frozen ice.)

The intermittently injected raw water 34 (about 1.8 ml) is almost instantaneously frozen and turns into ice 34' of a single crystal, one shot after another, while keeping this level of amount. Backed up by the water-freezing block 26, ice itself serves as a strong cold souse. When subsequent water is intermittently injected, the water equally turns into ice of a single crystal, which are piled on, one layer after another.

As detected by a level sensor or as calculated previously, a certain level of freezing operation is measured out, and the injection of raw water 34 is discontinued at that point.

Figure 12:
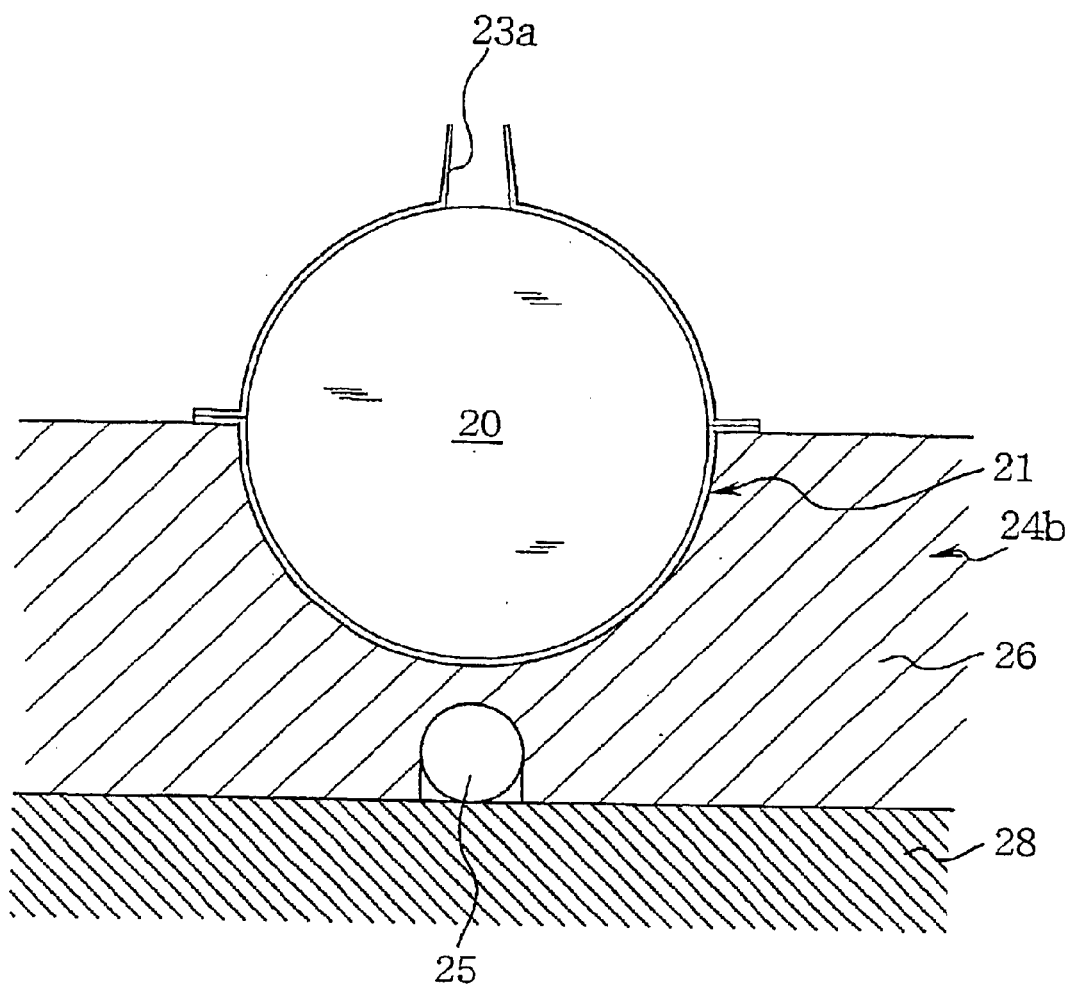
FIG. 12 is an explanatory diagram showing the equipment in the preferred embodiment of this invention in the state right after an ice ball has been completed and the upper mold has been removed.

Then, the upper mold 24a is withdrawn, as shown in FIG. 12. (Because of the existence of the domed lid 21a, there is no contact between the upper mold 24a and ice 20. Thus, the withdrawal is quickly carried out)

Similarly, the ice ball 20 can be easily taken out of the lower mold 24b because ice is packed in the spherical container 21.

The ice ball 20 packed in the spherical container 21 of a resinous sheet material such as styrene, is shipped as a commercial product merely by cutting or bending the cylinder 23a. In use, it is only necessary to separate between the flange 32 and the flange 33 to take out the ice ball 20 from the spherical container 21. This ice ball package is advantageous in its quite easy handling.

If the spherical container is made of a metal plate, such as aluminum, then the container is dipped in water to remove ice that has covered the container. After ice is taken out, the container is put back in the mold.

Figure 13:
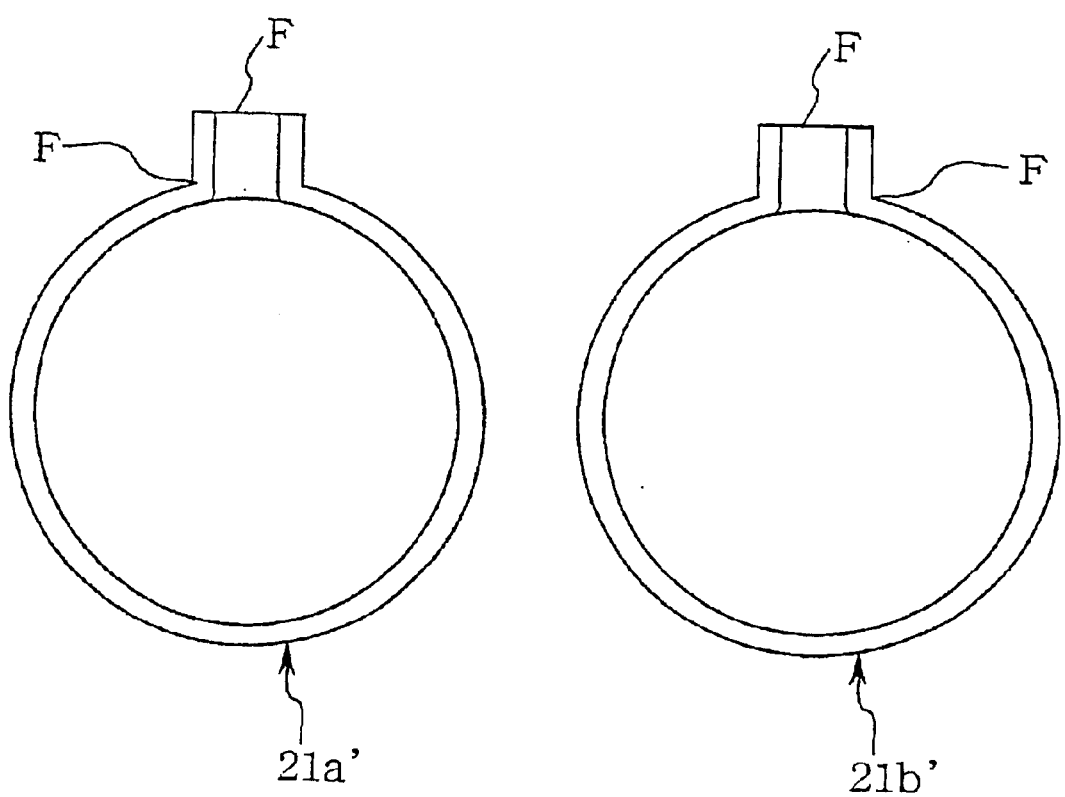
FIG. 13 is an explanatory diagram showing a spherical container of this invention, which has been separated vertically into right and left halves.
Figure 14:
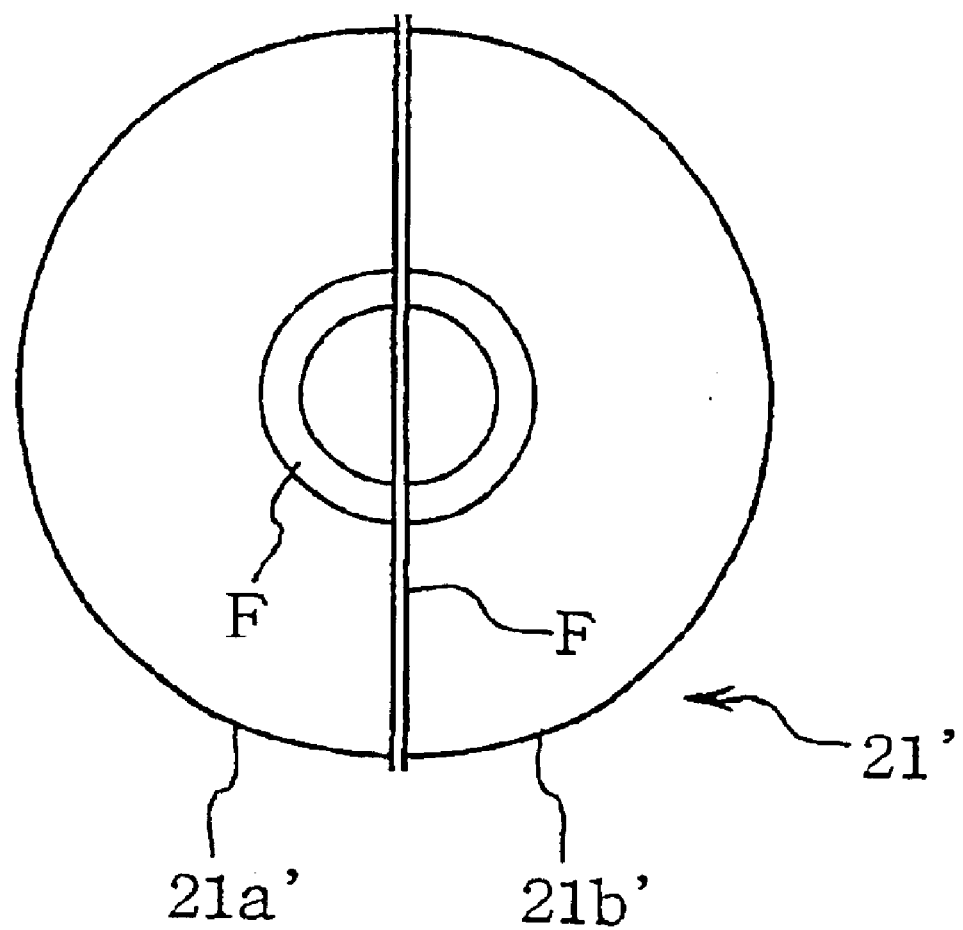
FIG. 14 is a plan view of the spherical container of the vertical separation type, wherein the two halves have been fitted to each other.
Figure 15:
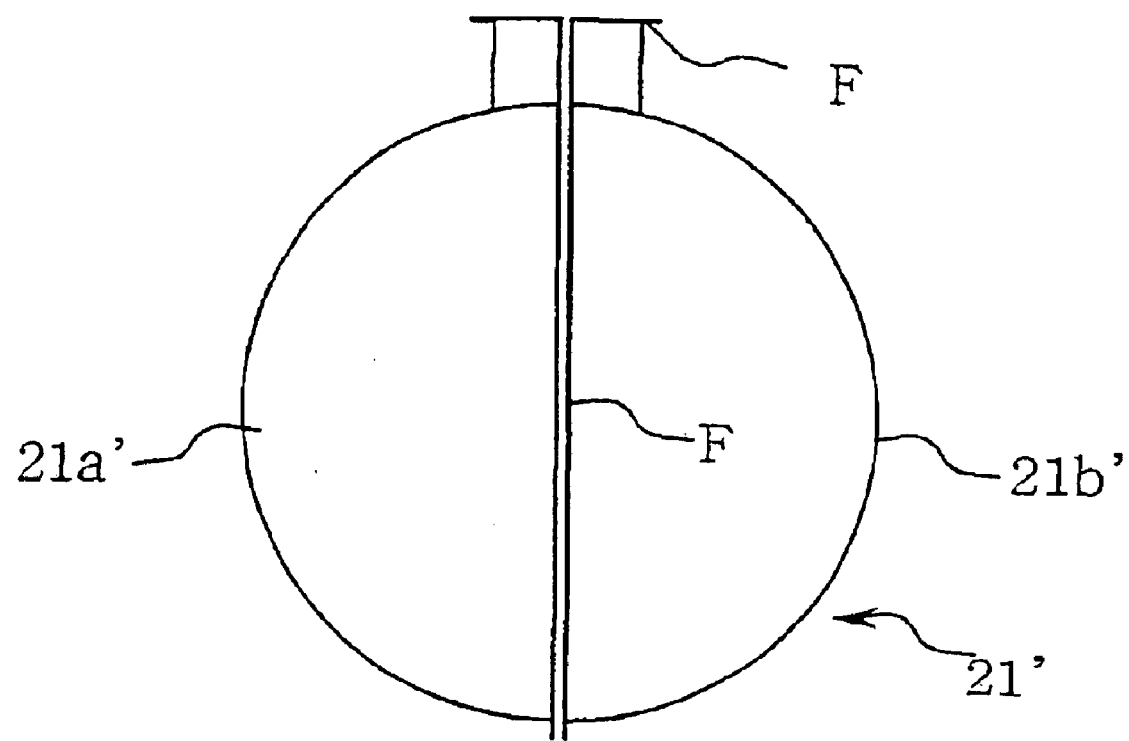
FIG. 15 is a front view of the spherical container shown in two halves that have been fitted to each other.

FIGS. 13–15 show the spherical container 21' of the vertical separation type. The container comprises right and left halves 21'a and 21'b, which are provided with a reinforcing flange F.

Figure 16A:
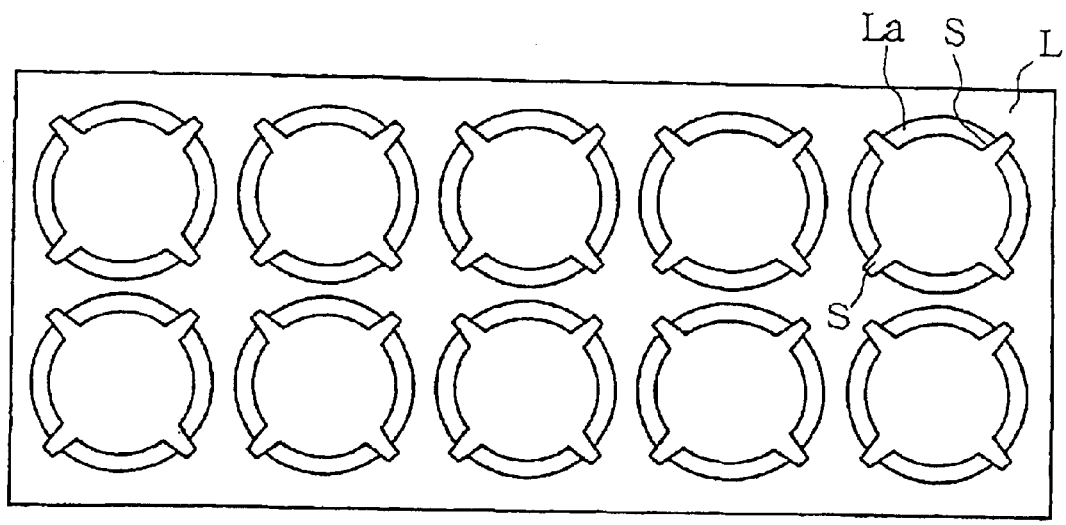
FIGS. 16a and 16b are a plan view and a front view of uniting rings to be used for the attachment of the spherical containers described above.
Figure 16B:
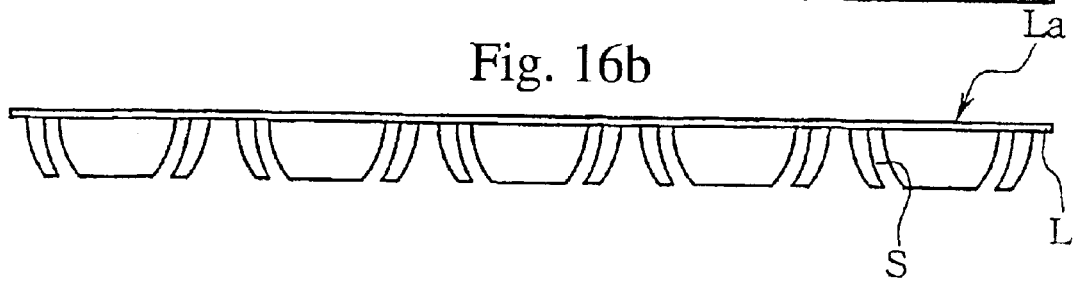
Figure 17A:
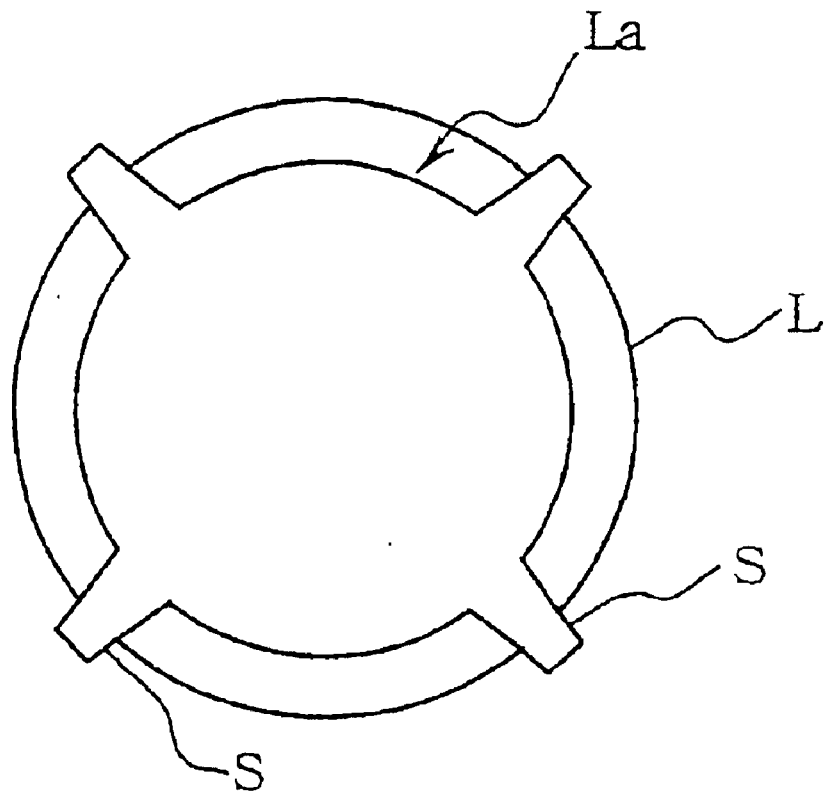
FIGS. 17a and 17b are the enlarged plan and front views of a uniting ring.
Figure 17B:
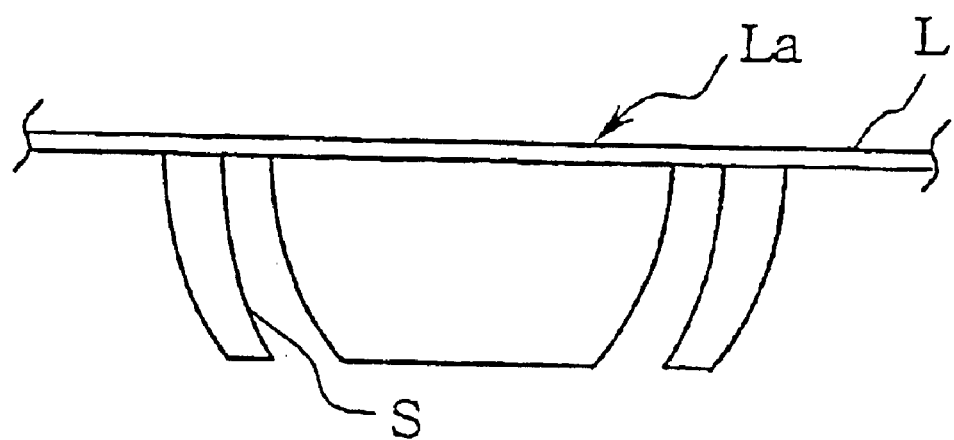
Figure 18:
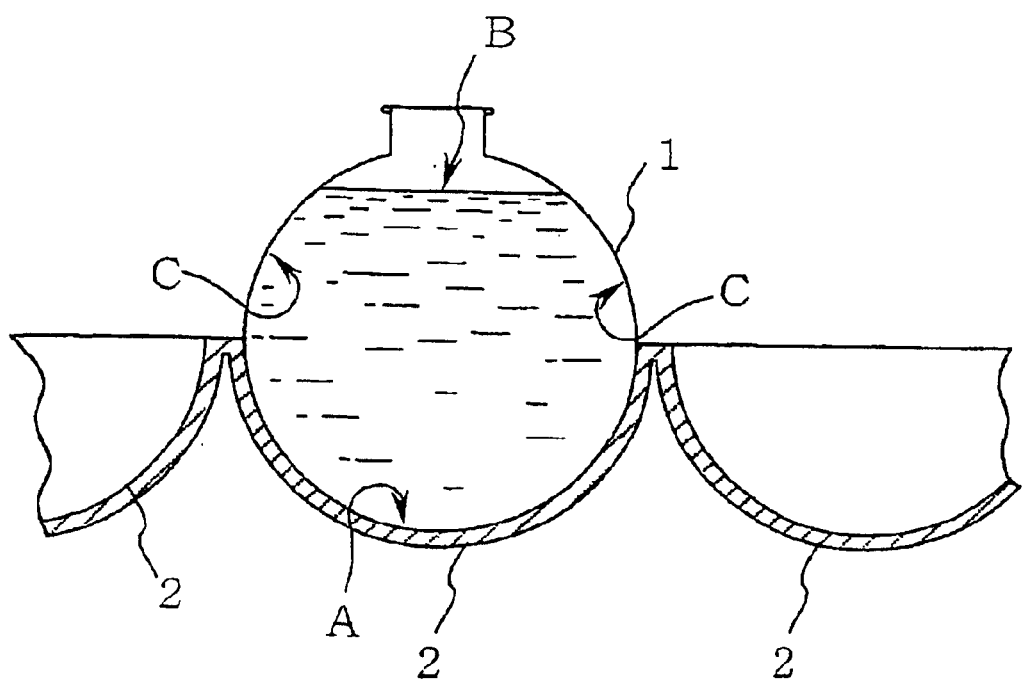
FIG. 18 is an explanatory diagram showing a conventional means of manufacturing an ice ball.
Figure 19:
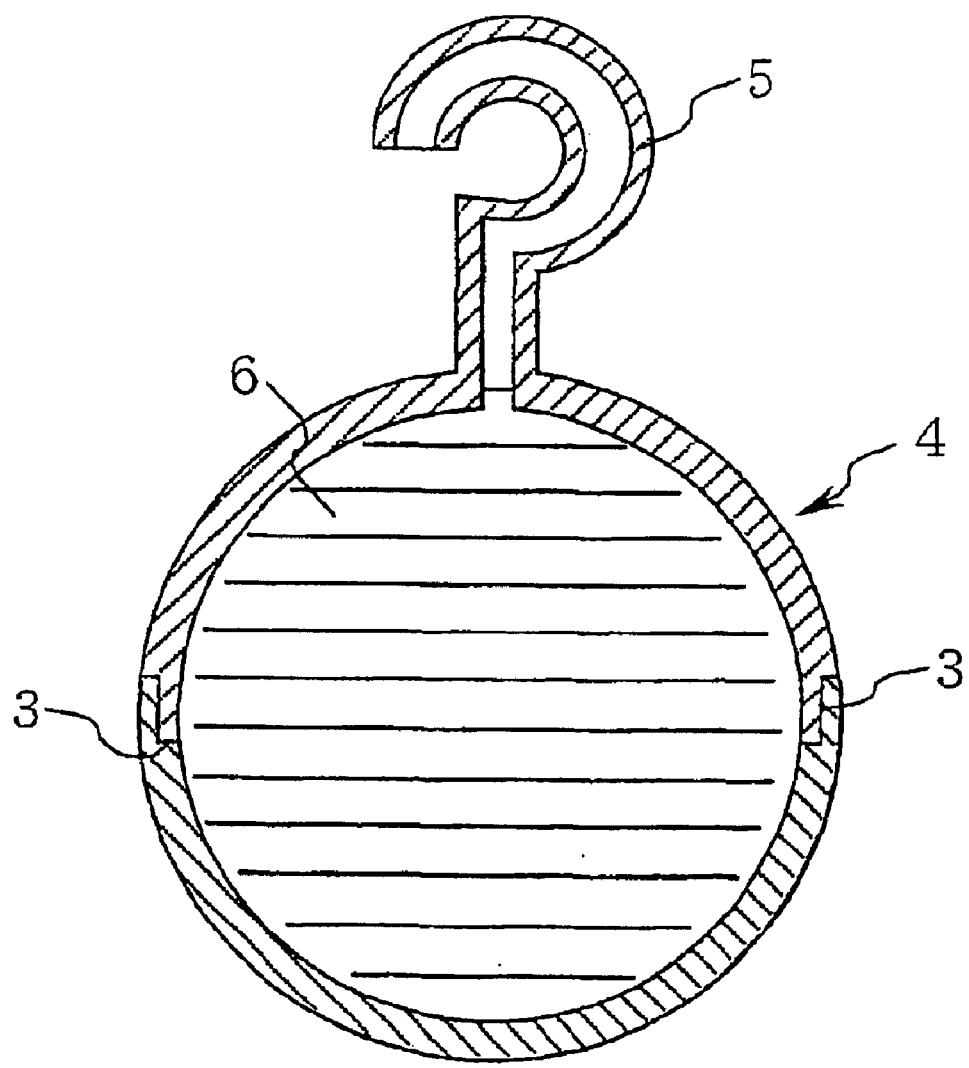
FIG. 19 is an explanatory diagram showing another conventional means of manufacturing an ice ball.
Figure 20A:
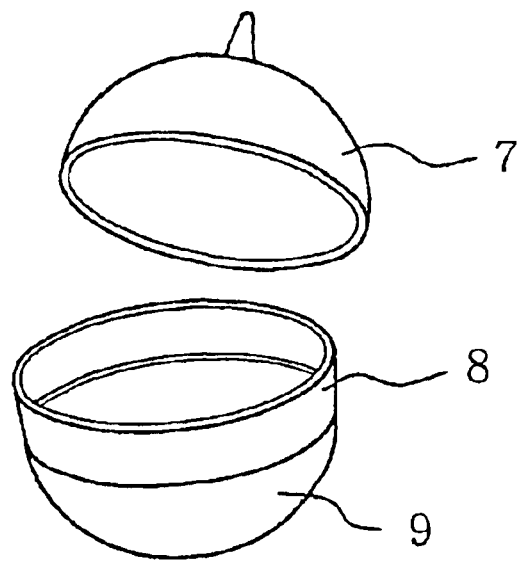
FIGS. 20a and 20b are explanatory diagrams showing still another means of manufacturing an ice ball of the conventional art.
Figure 20B:
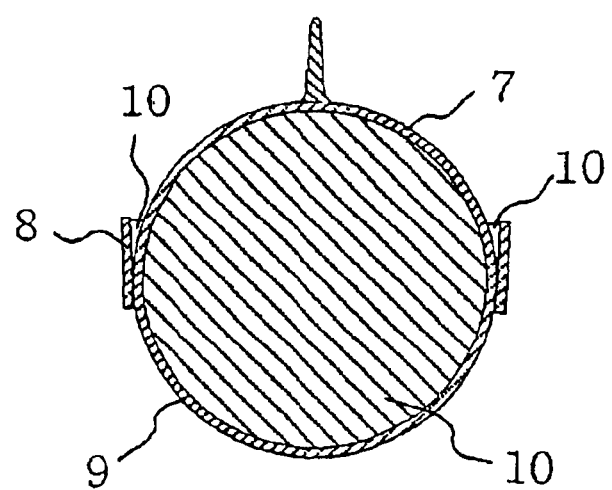
Figure 21:
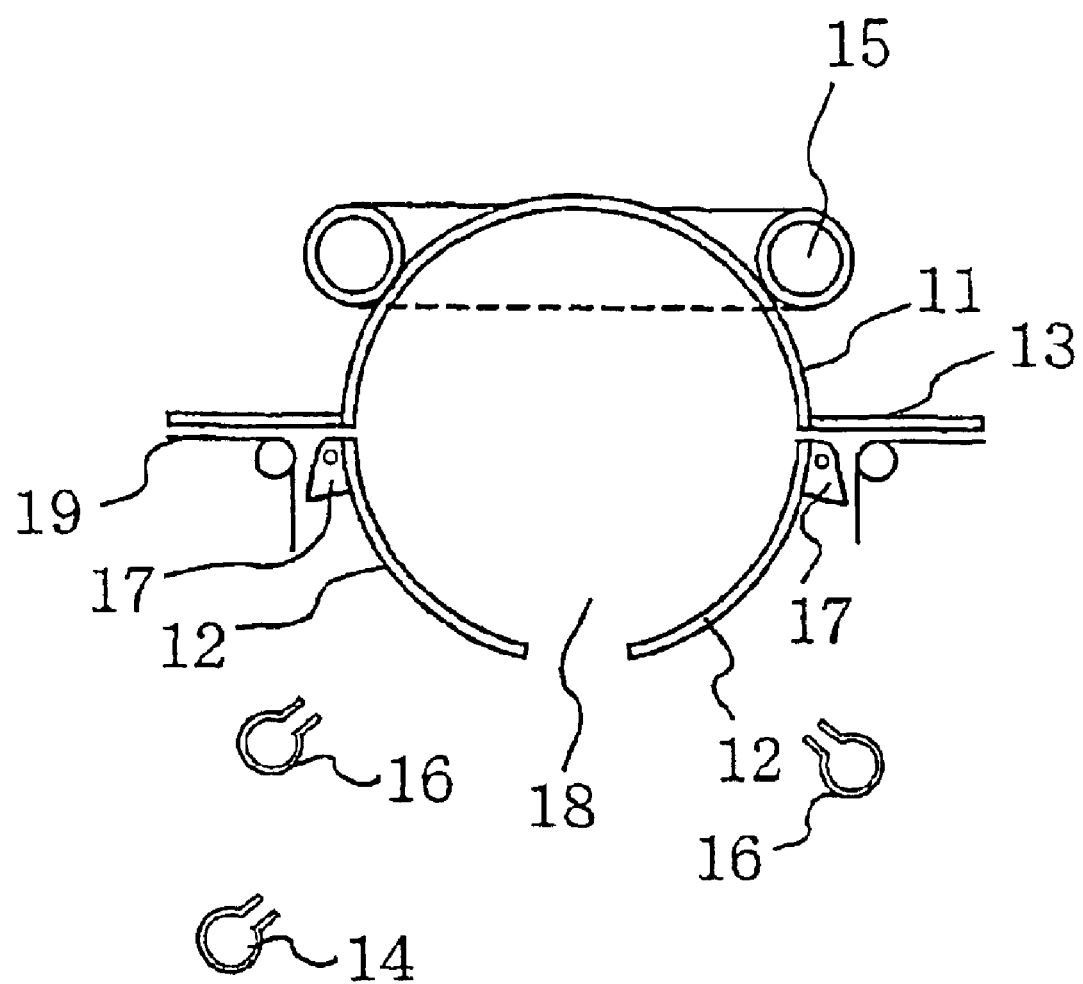
FIG. 21 is an explanatory diagram showing a conventional means of manufacturing laminates of clear ice in a mold.
Figures 22A, 22B, 22C, 22D:
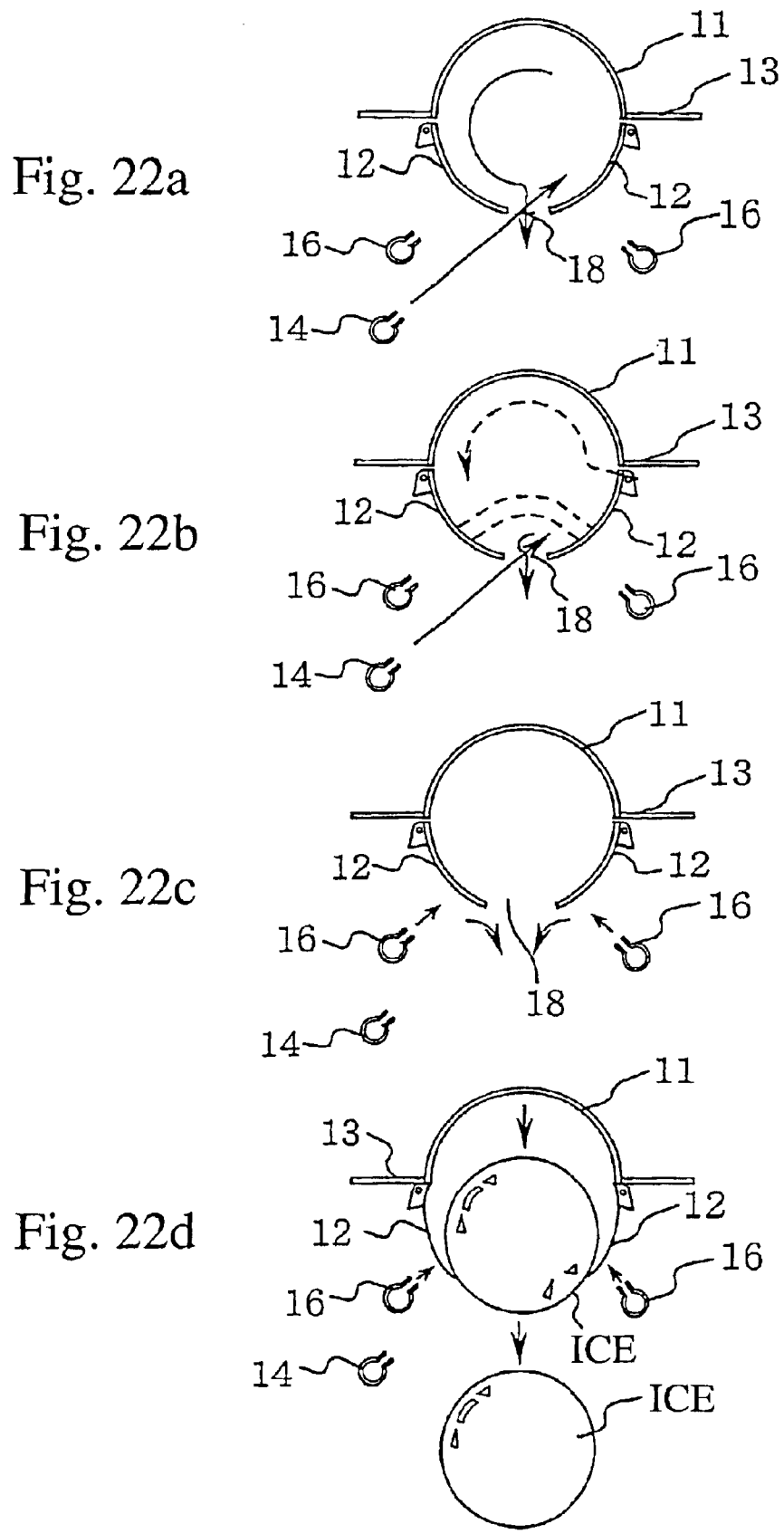
FIGS. 22a to 22d are explanatory diagrams showing the procedure of manufacturing an ice ball by using the means of FIG. 19.

FIGS. 16 and 17 show pairs of upper and lower uniting rings L of the same shape for attaching the two halves of the spherical containers 21'. FIG. 16 shows the uniting rings of the integral type; FIG. 17 is an enlarged view of a uniting ring L. As shown, ring hole La forms a container seat, and slits S are cut through the ring hole La to insert the above-described reinforcing flanges F (In FIG. 17, flanges are disposed in two directions to allow for possible selection). The slits S are cut so as to avoid interference from the next slits.

The uniting rings L, L cover the container from both up- and down-sides, and tighten up the two halves of the spherical containers 21' against the container diameter.

If the uniting rings L of the integral type are made of a good conductive material, such as aluminum, the spherical containers 21' are linked with one another, and are kept at the same temperature, which is preferable for the convenience of ice quality control.

Possibility of Industrial Utilization

This invention in the above-described configuration has the following effects.

(1) Ice can be mass-produced efficiently due to instantaneous freezing of injected water and easy takeout of ice right after water has been frozen.

(2) In the conventional art, input energy for cooling turned out to be a hindrance when ice was released from the mold. Additional heating energy had to be required for the release of ice, and then energy became necessary for freezing water again. In this invention there is no such wasteful utilization of energy. The cooling energy can be utilized effectively for the subsequent rounds of freezing operation. This ice-making method is ideal from the energy efficiency point of view.

(3) The spherical containers of this invention are convenient for combined use as a molding material and as a packaging material (in the case of the resinous sheet material). In addition, these containers make it unnecessary to heat and melt ice surface for the release from the ice-making cup, as found necessary in conventional art. These containers are ultimately rational as they can be used also as the release material. They are also convenient for taking out ice balls because the spherical containers can be divided into two halves.

(4) Ice according to this invention is not limited to the spherical shape. Clear ice of other desired shapes, such as ice cubes, is obtained if the mold is replaced with another one for different shaped ice, provided that the ice containers can be separated into upper and lower halves.

(5) It is possible to use various solutions, instead of fresh water, as the raw water. If raw water is a liquid or something else to qualify spirits with, then the spirits with shaped ice require no additional water. Furthermore, such drinks as coffee, tea, and juice can be turned into shaped ice.

What is claimed is:

1. A process for manufacturing clear, solid ice, comprising the steps of:
a) preparing a mold, which comprises an upper mold made of an insulating material and provided with a vertical injection hole drilled therein and a water-jet nozzle fitted in the hole; and a lower mold made of a water-freezing block having coolant pipe embedded therein;
b) preparing for a lid made of an insulating sheet, said lid having a shape that fits in with a surface shaped for the upper mold and being provided with a bottom flange and a cylinder for being fitted into the vertical injection hole; and a cup of a same insulating sheet, which similarly fits in with a shaped surface of the lower mold and is provided with a top flange;
c) assembling the upper mold and the lower mold of the mold after the lid and the cup have been attached tightly to each other to form a container and placed in the mold;
d) then, keeping liquid to be frozen cooled at a predetermined temperature and spraying the liquid intermittently in a direction of a water-freezing block that has been cooled to a predetermined freezing temperature;
e) repeating a spraying operation to freeze the sprayed liquid in the container, layer by layer, until clear ice is formed; and f) disassembling the mold under an ice-releasing effect, which the container has on the mold, and immediately taking out the ice.

2. The process for manufacturing clear, solid ice, according to claim 1, wherein the container is of a type divided into upper and lower halves and comprises the lid that tightly fits in with the surface shaped for the upper mold and being provided with the bottom flange and the cylinder for being fitted into the vertical injection hole; and the cup that similarly fits in with the shaped surface of the lower mold and is provided with the top flange.

3. The process for manufacturing clear, solid ice, according to claim 1, wherein the container is vertically divided into right and left halves, and is provided with reinforcing flanges and the cylinder for being fitted into the vertical injection hole, with the container being put in tight contact with the surfaces of the upper mold and the lower mold and said right and left container halves being attached to each other by a pair of upper and lower uniting rings having a round container seat.

4. The process for manufacturing clear, solid ice, according to claim 2, wherein the container is made of a resinous sheet material.

5. The process for manufacturing clear, solid ice, according to claim 2, wherein the container is made of a hard, conductive metal material.

6. The process for manufacturing clear, solid ice, according to claim 3, wherein the container is made of a resinous sheet material.

7. The process for manufacturing clear, solid ice, according to claim 3, wherein the container is made of a hard, conductive metal material.

8. Equipment for manufacturing clear, solid ice, comprises:
   a mold for making ice, which comprises an upper mold made of an insulating material having a vertical injection hole drilled therein and a water-jet nozzle fitted in the hole and connected to an intermittent injection mechanism; and a lower mold made of a water-freezing block having coolant pipe embedded therein; and
   containers, each container comprising a lid made of an insulating sheet, said lid having a shape corresponding to a surface shaped for the upper mold and being provided with a bottom flange and a cylinder for being fitted into the vertical injection hole; and a cup of a same insulating sheet, which similarly corresponds to a shaped surface of the lower mold and is provided with a top flange.

9. The equipment for manufacturing clear, solid ice, according to claim 8, wherein the container is of a type divided into upper and lower halves and comprises the lid that tightly fits in with the surface shaped for the upper mold and being provided with the bottom flange and the cylinder for being fitted into the vertical injection hole; and the cup that similarly fits in with the shaped surface of the lower mold and is provided with the top flange.

10. The equipment for manufacturing clear, solid ice, according to claim 8, wherein the container is vertically divided into right and left halves, and is provided with reinforcing flanges and the cylinder for being fitted into the vertical injection hole, with the container being put in tight contact with the surfaces of the upper mold and the lower mold and said right and left container halves being attached to each other by a pair of upper and lower uniting rings having a round container seat.

11. The equipment for manufacturing clear, solid ice, according to claim 9, wherein the container is made of a resinous sheet material.

12. The equipment for manufacturing clear, solid ice, according to claim 9, wherein the container is made of a hard, conductive metal material.

13. The equipment for manufacturing clear, solid ice, according to claim 8, wherein the intermittent injection mechanism takes pressurized water out of circulation pipe by way of tube pumps.

14. The equipment for manufacturing clear, solid ice, according to claim 13, wherein a pushing mechanism used for the tube pumps stands face to face with an arc surface of a pump mount for accommodating the tube pumps; wherein a rotating body of the pushing mechanism comprises one-point pressure rollers disposed around a shaft but not in contact with a circumference thereof of the shaft, said shaft extending between two rotatable brackets and supporting one-point pressure rollers at roller shafts; wherein tubes are disposed between the pump mount and the rotating body, with a tube upstream being fixed, and a tube downstream unfixed; and wherein a thin foil material having high durability, flexibility, and the slidability against the rollers is disposed between the tubes and the rotating body, with an upstream side fixed, and a downstream side unfixed.

15. The equipment for manufacturing clear, solid ice, according to claim 10, wherein the container is made of a resinous sheet material.

16. The equipment for manufacturing clear, solid ice, according to claim 10, wherein the container is made of a hard, conductive metal material.

17. The equipment for manufacturing clear, solid ice, according to claim 9, wherein the intermittent injection mechanism takes pressurized water out of circulation pipe by way of tube pumps.

18. The equipment for manufacturing clear, solid ice, according to claim 10, wherein the intermittent injection mechanism takes pressurized water out of circulation pipe by way of tube pumps.

19. The equipment for manufacturing clear, solid ice, according to claim 11, wherein the intermittent injection mechanism takes pressurized water out of circulation pipe by way of tube pumps.

20. The equipment for manufacturing clear, solid ice, according to claim 12, wherein the intermittent injection mechanism takes pressurized water out of circulation pipe by way of tube pumps.

* * * * *